US009871829B2

(12) United States Patent
Ramachandran et al.

(10) Patent No.: US 9,871,829 B2
(45) Date of Patent: *Jan. 16, 2018

(54) VOICE OVER IP (VOIP) NETWORK INFRASTRUCTURE COMPONENTS AND METHOD

(71) Applicant: GENBAND US LLC, Frisco, TX (US)

(72) Inventors: Sridhar Ramachandran, Rockville, MD (US); Paritosh Tyagi, Germantown, MD (US); Saravanan Mallesan, Faifax, VA (US); Gaurav Kulshreshtha, Herndon, VA (US); Rohini Raman, Germantown, MD (US); Medhavi Bhatia, Germantown, MD (US); Sohan Shetty, Germantown, MD (US)

(73) Assignee: GENBAND US LLC, Plano, TX (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/727,639

(22) Filed: Jun. 1, 2015

(65) Prior Publication Data
US 2015/0264089 A1 Sep. 17, 2015

Related U.S. Application Data

(60) Continuation of application No. 14/293,624, filed on Jun. 2, 2014, now Pat. No. 9,049,143, which is a
(Continued)

(51) Int. Cl.
*H04L 29/06* (2006.01)
*H04L 12/64* (2006.01)
(Continued)

(52) U.S. Cl.
CPC ...... *H04L 65/1046* (2013.01); *H04L 12/6418* (2013.01); *H04L 29/06319* (2013.01);
(Continued)

(58) Field of Classification Search
CPC combination set(s) only.
See application file for complete search history.

(56) References Cited

U.S. PATENT DOCUMENTS

| 4,164,193 A | 8/1979 | Smith |
| 5,918,020 A | 6/1999 | Blackard et al. |

(Continued)

FOREIGN PATENT DOCUMENTS

| CN | 1556655 A | 12/2004 |
| EP | 1263242 A2 | 12/2002 |

(Continued)

OTHER PUBLICATIONS

Yenra: VOIP: Session Border Controller [online], [retrieved on Dec. 20, 2004]. Retrieved from the Internet: (2 pages).
(Continued)

*Primary Examiner* — Joseph J Nguyen
(74) *Attorney, Agent, or Firm* — Forgarty LLP

(57) ABSTRACT

A voice over Internet protocol communication system and method provides infrastructure components as intermediaries between networks, the components include multi-protocol session controllers and a multi-protocol signaling switch as well as a management system. The session controllers process calls and participate in the calls that flow through it. The session controllers process calls that are either at the edge of the network or at the core of the voice over Internet protocol network. The session controllers associate calls with one another in call peers for incoming calls as ingress call peers and for outgoing calls as egress call peers. A centralized database of call routing policies is provided to the session controllers. The session controllers provide cost management, topology hiding, and inter-working, or conversion, of calls from SIP networks to H.323 networks for both voice and video.

19 Claims, 17 Drawing Sheets

Related U.S. Application Data continuation of application No. 13/436,813, filed on Mar. 30, 2012, now Pat. No. 8,743,870, which is a division of application No. 11/026,746, filed on Dec. 31, 2004, now Pat. No. 8,194,640.

(51) Int. Cl.
| | |
|---|---|
| *H04L 12/701* | (2013.01) |
| *H04L 12/70* | (2013.01) |
| *H04L 12/801* | (2013.01) |
| *H04L 29/08* | (2006.01) |
| *H04L 12/715* | (2013.01) |
| *H04L 12/725* | (2013.01) |
| *H04L 12/24* | (2006.01) |
| *H04M 7/12* | (2006.01) |

(52) U.S. Cl.
CPC .......... *H04L 41/0893* (2013.01); *H04L 41/12* (2013.01); *H04L 45/00* (2013.01); *H04L 45/04* (2013.01); *H04L 45/3065* (2013.01); *H04L 47/00* (2013.01); *H04L 47/10* (2013.01); *H04L 65/1066* (2013.01); *H04L 65/1069* (2013.01); *H04L 65/80* (2013.01); *H04L 67/1072* (2013.01); *H04L 67/14* (2013.01); *H04M 7/126* (2013.01)

(56) References Cited

U.S. PATENT DOCUMENTS

| | | |
|---|---|---|
| 6,078,582 A | 6/2000 | Curry et al. |
| 6,473,793 B1 | 10/2002 | Dillon et al. |
| 6,570,855 B1 | 5/2003 | Kung et al. |
| 6,600,737 B1 | 7/2003 | Lai et al. |
| 6,660,737 B2 | 12/2003 | Almstead et al. |
| 6,678,359 B1 | 1/2004 | Gallick |
| 6,738,808 B1 | 5/2004 | Zellner et al. |
| 6,775,269 B1 | 8/2004 | Kaczmarczyk et al. |
| 6,775,280 B1 | 8/2004 | Ma et al. |
| 6,798,786 B1 | 9/2004 | Lo et al. |
| 6,904,017 B1 | 6/2005 | Meempat et al. |
| 6,925,461 B2 | 8/2005 | Byers |
| 6,944,678 B2 | 9/2005 | Lu et al. |
| 6,980,526 B2 | 12/2005 | Jang et al. |
| 7,002,973 B2 | 2/2006 | MeLampy et al. |
| 7,028,092 B2 | 4/2006 | MeLampy et al. |
| 7,031,311 B2 | 4/2006 | MeLampy et al. |
| 7,072,303 B2 | 7/2006 | MeLampy et al. |
| 7,116,767 B2 | 10/2006 | Yang et al. |
| 7,133,923 B2 | 11/2006 | MeLampy et al. |
| 7,142,532 B2 | 11/2006 | Penfield et al. |
| 7,151,781 B2 | 12/2006 | MeLampy et al. |
| 7,180,993 B2 | 2/2007 | Hamilton |
| 7,193,996 B2 | 3/2007 | Dobbins et al. |
| 7,260,060 B1 | 8/2007 | Abaye et al. |
| 7,260,085 B2 | 8/2007 | Dobbins et al. |
| 7,277,384 B1 | 10/2007 | Chan et al. |
| 7,289,489 B1 | 10/2007 | Kung et al. |
| 7,411,975 B1 | 8/2008 | Mohaban |
| 7,457,312 B2 | 11/2008 | Weiss et al. |
| 7,512,078 B2 | 3/2009 | Swain et al. |
| 7,542,641 B1 | 6/2009 | Oran |
| 7,739,395 B1 | 6/2010 | Parlamas et al. |
| 7,974,394 B1 | 7/2011 | Cao et al. |
| 8,085,758 B2 | 12/2011 | Ramachandran et al. |
| 8,194,640 B2 | 6/2012 | Ramachandran et al. |
| 8,254,265 B2 | 8/2012 | Ramachandran et al. |
| 8,547,962 B2 | 10/2013 | Ramachandran et al. |
| 8,743,870 B2 | 6/2014 | Ramachandran et al. |
| 8,755,371 B2 | 6/2014 | Ramachandran et al. |
| 9,049,143 B2 | 6/2015 | Ramachandran et al. |
| 2001/0050911 A1 | 12/2001 | Eastman |
| 2002/0062376 A1 | 5/2002 | Isoyama |
| 2002/0062379 A1 | 5/2002 | Widegren et al. |
| 2002/0129236 A1 | 9/2002 | Nuutinen |
| 2002/0133600 A1 | 9/2002 | Williams et al. |
| 2002/0136206 A1 | 9/2002 | Gallant et al. |
| 2002/0181427 A1 | 12/2002 | Sparr et al. |
| 2003/0016627 A1 | 1/2003 | MeLampy et al. |
| 2003/0035401 A1 | 2/2003 | Shaheen et al. |
| 2003/0051130 A1 | 3/2003 | MeLampy et al. |
| 2003/0137942 A1 | 7/2003 | Ladegaard |
| 2003/0142681 A1 | 7/2003 | Chen et al. |
| 2003/0145077 A1 | 7/2003 | Khan et al. |
| 2003/0186702 A1 | 10/2003 | McConnell et al. |
| 2003/0202506 A1 | 10/2003 | Perkins et al. |
| 2003/0206546 A1 | 11/2003 | Beyda |
| 2004/0005041 A1 | 1/2004 | Zahir Azami |
| 2004/0005892 A1 | 1/2004 | Mayer et al. |
| 2004/0009776 A1 | 1/2004 | Ishikawa et al. |
| 2004/0010514 A1 | 1/2004 | Agarwal et al. |
| 2004/0045030 A1 | 3/2004 | Reynolds et al. |
| 2004/0072593 A1 | 4/2004 | Robbins et al. |
| 2004/0086093 A1 | 5/2004 | Schranz |
| 2004/0152422 A1 | 8/2004 | Hoglund et al. |
| 2004/0156491 A1 | 8/2004 | Reding et al. |
| 2004/0181686 A1* | 9/2004 | Krause .................... H04L 12/66 726/30 |
| 2004/0224678 A1 | 11/2004 | Dahod et al. |
| 2004/0249927 A1 | 12/2004 | Pezutti |
| 2004/0266426 A1 | 12/2004 | Marsh et al. |
| 2005/0021804 A1 | 1/2005 | Hameleers et al. |
| 2005/0025123 A1 | 2/2005 | Mitsumori et al. |
| 2005/0041648 A1 | 2/2005 | Bharatia et al. |
| 2005/0052993 A1 | 3/2005 | Hanks et al. |
| 2005/0052996 A1 | 3/2005 | Houck et al. |
| 2005/0070230 A1 | 3/2005 | Das et al. |
| 2005/0074026 A1 | 4/2005 | Soncodi et al. |
| 2005/0078690 A1 | 4/2005 | DeLangis |
| 2005/0083895 A1 | 4/2005 | Pinault |
| 2005/0084088 A1 | 4/2005 | Hamilton |
| 2005/0089014 A1 | 4/2005 | Levin et al. |
| 2005/0108567 A1 | 5/2005 | D'Souza et al. |
| 2005/0111382 A1 | 5/2005 | Le et al. |
| 2005/0185657 A1 | 8/2005 | Karanassos |
| 2005/0207358 A1 | 9/2005 | Nishida et al. |
| 2005/0210292 A1* | 9/2005 | Adams .............. H04L 29/06027 726/5 |
| 2006/0045095 A1 | 3/2006 | Dhar et al. |
| 2006/0067298 A1 | 3/2006 | Houck et al. |
| 2006/0083193 A1 | 4/2006 | Womack et al. |
| 2006/0093115 A1 | 5/2006 | Chen et al. |
| 2006/0098577 A1 | 5/2006 | MeLampy et al. |
| 2006/0117097 A1 | 6/2006 | Ogasawara et al. |
| 2006/0146792 A1 | 7/2006 | Ramachandran et al. |
| 2006/0147015 A1* | 7/2006 | Baumeister ......... H04M 3/4931 379/210.02 |
| 2006/0156126 A1 | 7/2006 | Oshima |
| 2006/0159129 A1 | 7/2006 | Schmidt |
| 2006/0178130 A1 | 8/2006 | Makrygiannis |
| 2006/0187927 A1 | 8/2006 | MeLampy et al. |
| 2006/0218268 A1 | 9/2006 | Beck et al. |
| 2006/0239255 A1 | 10/2006 | Ramachandran et al. |
| 2006/0259958 A1 | 11/2006 | Jennings et al. |
| 2006/0285493 A1 | 12/2006 | Manuja et al. |
| 2006/0291447 A1 | 12/2006 | Siliquini et al. |
| 2006/0291450 A1 | 12/2006 | Ramachandran et al. |
| 2007/0019563 A1 | 1/2007 | Ramachandran et al. |
| 2007/0019625 A1 | 1/2007 | Ramachandran et al. |
| 2007/0036151 A1 | 2/2007 | Baeder |
| 2007/0076591 A1 | 4/2007 | Khan |
| 2007/0076594 A1 | 4/2007 | Khan et al. |
| 2007/0076603 A1 | 4/2007 | MeLampy et al. |
| 2007/0076710 A1 | 4/2007 | Khan |
| 2007/0076855 A1 | 4/2007 | MeLampy et al. |
| 2007/0104105 A1 | 5/2007 | MeLampy et al. |
| 2007/0116043 A1 | 5/2007 | MeLampy et al. |
| 2007/0140223 A1 | 6/2007 | Bhatia et al. |
| 2007/0156491 A1 | 7/2007 | Schuler et al. |
| 2007/0286158 A1 | 12/2007 | Cook |
| 2007/0291734 A1 | 12/2007 | Bhatia et al. |
| 2008/0086564 A1 | 4/2008 | Putman et al. |
| 2008/0239957 A1 | 10/2008 | Tokura et al. |

(56) References Cited

U.S. PATENT DOCUMENTS

| | | |
|---|---|---|
| 2010/0309906 A1 | 12/2010 | Ramachandran et al. |
| 2012/0189001 A1 | 7/2012 | Ramachandran et al. |
| 2014/0269682 A1 | 9/2014 | Ramachandran et al. |
| 2014/0321453 A1 | 10/2014 | Ramachandran et al. |
| 2015/0264089 A1 | 9/2015 | Ramachandran et al. |

FOREIGN PATENT DOCUMENTS

| | | |
|---|---|---|
| WO | 2002049279 A2 | 6/2002 |
| WO | 2002049315 A2 | 6/2002 |
| WO | 2002049316 A2 | 6/2002 |
| WO | 2002058349 A1 | 7/2002 |
| WO | 2007075527 A3 | 7/2007 |

OTHER PUBLICATIONS

Office Action for Japanese Patent Application No. 2007-549342 (dated May 13, 2010).
Notification of Transmittal of the International Search Report and the Written Opinion of the International Searching Authority, or the Declaration for International Application No. PCT/US2006/048166 (dated Nov. 10, 2008).
Communication of European Publication Number and Information on the Application of Article 67(3) EPC for European Patent No. 1969788 (dated Aug. 20, 2008).
International Search Report and Written Opinion for International Application No. PCT/US05/18870 (dated Oct. 31, 2005).
"Denial of Service—Understanding Attack Techniques," White Paper (Jun. 22, 2005).
"Packet Voice Over Broadband," Light Reading—Networking the Telecom Industry (Mar. 3, 2005).
Walker et al., "Release 2 Architecture," MSF Release 2 Architecture, MSF-ARCH-002.00-Final, Multiservice Switching Forum (Jan. 4, 2005).
Le et al., "A Review of Mobility Support Paradigms for the Internet" (Jan. 2005).
"Media Access Control (MAC) Bridges," IEEE 802.1D Standard for Local and Metropolitan Area Networks (Jun. 9, 2004).
Intel, "Intel IXP2400 Network Processor Datasheet," Document No. 301164-011, pp. 1-126 (Feb. 2004).
Distributed Denial of Service Attacks, White Paper: Prolexic Technologies, Inc., Q4 (2004).
Rosenberg et al., "An Extension to the Session Initiation Protocol (SIP) for Symmetric Response Routing," RFC 3581, pp. 1-13 (Aug. 2003).
Schulzrinne et al., "RTP: A Transport Protocol for Real-Time Application," Network Working Group, RFC 3550 (Jul. 2003).
Rosenberg,The Real Time Transport Protocol (RIP) Denial of Service (Dos) Attack and its Prevention, pp. 1-6 (Jun. 23, 2003).
"Virtual Bridged Local Area Networks," IEEE Standards 802.1Q, pp. 1-327 (May 7, 2003).
Garcia-Martin et al., "Private Header (P-Header) Extensions to the Session Initiation Protocol (SIP) for the 3rd-Generation Partnership Project (3GPP)," RFC 3455, pp. 1-34 (Jan. 2003).
Sisalem et al., "Denial of Service Attacks and SIP Infrastructure" (2003).
Rosenberg et al., "An Offer/Answer Model with the Session Description Protocol (SDP)," RFC 3264 (Jun. 2002).
Rosenberg et al., "SIP: Session Initiation Protocol," RFC 3261, pp. 1-252 (Jun. 2002).
Rosenberg et al., "Session Initiation Protocol (SIP): Locating SIP Servers," RFC 3263, pp. 1-16 (Jun. 2002).
Hayes, "IP Based Multimedia Services Platform," Ericsson, 3GPP, ITU-T IMT-2000 and Beyond, Ottawa, Canada, 19 pages (May 28, 2002).
"Session Control in IMS Architecture," Newport Networks, White Papers (Copyright 2002-2005).
Acme Packet, Inc., "Session Admission control: Interactive communication SLAs over Skinny Pipes," 14 pages (2002).
Schulzrinne et al., "RTP Payload for DTMF Digits, Telephony Tones and Telephony Signals," Network Work Group, RFC 2833 (May 2000).
Handley et al., "SIP: Session Initiation Protocol," RFC 2543, pp. 1-143 (Mar. 1999).
Crocker, D., "ARPA Internet Text Messages," RFC 822 (Aug. 13, 1982).
"SDP: Session Description Protocol Overview (RFC 2327)," Javvin Network Management & Security (Downloaded from the Internet Aug. 15, 2005).
Enterprise Networks & Servers, "Kagoor Delivers New XpressPath Media Routing" [online] [retrieved on Dec. 20, 2004]. Retrieved from the Internet: (1 page). "Kagoor Delivers New XpressPath Media Routing," Enterprise Networks and Servers, http://www.enterprisenetworksandservers.com/monthly/art.php/.800, p. 1 (Jul. 2004).
Gallon et al., "Bandwidth Management in Next Generation Packet Networks," MSF Technical Report, MSF-TR-ARCH-005-Final, MultiService Forum (Aug. 2005).
"The E-Model, a Computational Model for use in Transmission Planning," ITU-T, G.107, pp. 1-25 (Dec. 1998).
Handley et al., "SDP: Session Description Protocol," RFC 2327, pp. 1-40 (Apr. 1998).
Notification of European publication number and information on the application of Article 67(3) EPC for European Application No. 05763863.7 (dated Aug. 16, 2007).
Notification of Second Office Action for Chinese Application No. 200580048016.9 (dated Sep. 3, 2012).
"Session Border Controller," YENRA, http://www.yenra.com/session-border-controller/, pp. 1-2 (Oct. 18, 2004).
Supplementary European Search Report for European Application No. 05763863.7 (dated Feb. 16, 2012).
Extended European Search Report for European Application No. 06845686.2 (dated Mar. 6, 2014).
Bond et al., "An Open Architecture for Next-Generation Telecommunication Services," ACM Transactions on Internet Technology, vol. 4, No. 1, pp. 83-123 (Feb. 2004).

* cited by examiner

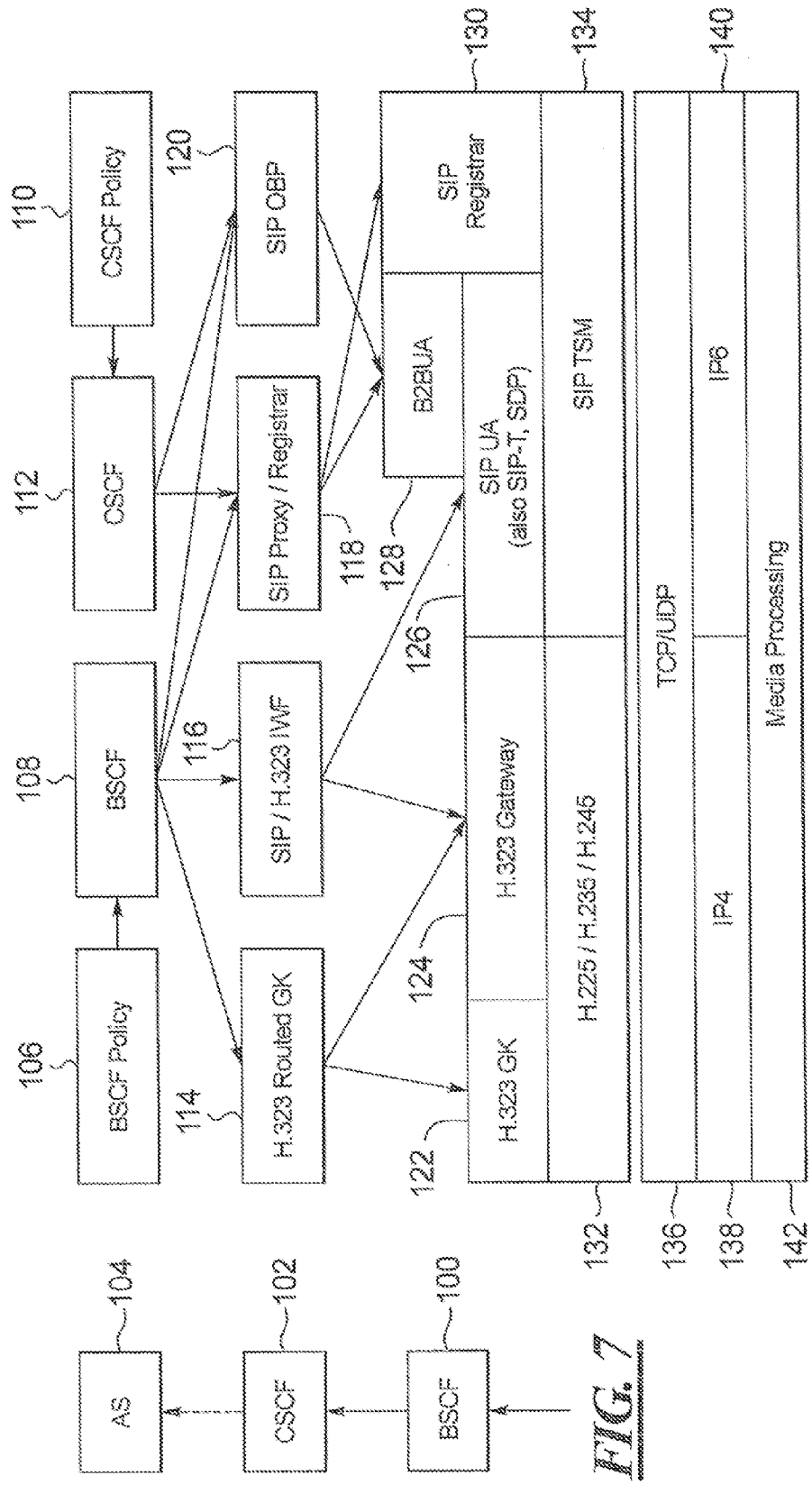

VOICE OVER IP (VOIP) NETWORK INFRASTRUCTURE COMPONENTS AND METHOD

PRIORITY CLAIM

This application is a continuation of, and claims priority to, U.S. patent application Ser. No. 14/293,624 filed on Jun. 2, 2014; which in turn is a continuation of, and claims priority to, U.S. patent application Ser. No. 13/436,813 filed on Mar. 30, 2012; which in turn is a divisional of, and claims priority to, U.S. patent application Ser. No. 11/026,746 filed Dec. 31, 2004; the disclosures of which are incorporated herein by reference in their entirety.

BACKGROUND OF THE INVENTION

Field of the Invention

The present invention relates generally to a method and apparatus for carrying real time services, such as voice telecommunication, via a packet switched network and in particular to an apparatus and method for voice, facsimile and multimedia over Internet Protocol (IP) communications components.

Description of the Related Art

Voice telecommunications has traditionally been conducted via dedicated telephone networks utilizing telephone switching offices and either wired or wireless connections for transmitting the voice signal between the users' telephones. Such telecommunications, which use the Public Switched Telephone Network (PSTN), may be referred to as circuit committed communications. Voice over Internet Protocol (VoIP) provides an alternative voice telecommunication means which use discrete packets digitized voice information to transmit the voice signals. The packets are transmitted either over the public Internet or within intranets.

Typical VoIP network infrastructure includes gateways, gatekeepers, proxy servers, softswitches, session border controllers, etc. Due to optimization of network resources and to particular designs, network operators may choose to integrate functionality of the separate components with one another such that multiple infrastructure components can be collocated on one physical component.

It is desirable that the VoIP network infrastructure components be designed into a network such that network operators can provide meaningful services to their customers.

The following terms are used in this disclosure:

Gateway—An entity that can bridge or serve as a "gateway" between networks. In VoIP, it typically refers to a device that can "gateway" between the traditional Public Switched Telephone Network (PSTN) and the VoIP network.

Gatekeeper—An entity that works in conjunction with the gateway to determine how to handle VoIP calls. The gatekeeper can be either in the call path or play only a consultative role in every call. The gatekeeper usually only handles VoIP calls setup using the H.323 protocol.

Proxy Server—An intermediate entity, similar in functionality to the gatekeeper, that determines how to handle VoIP calls. A proxy server usually only handles VoIP calls setup using the session initiation protocol (SIP).

User Agent—An entity that can place or receive a VoIP call, usually based on the SIP protocol (session initiation protocol).

Border element—A border element is also called network edge element. This is typically where the policy definitions or the administrative control changes. Policy can be defined at virtually all layers in the seven layer open systems interconnection (OSI) model. For example, at layer three of the seven layer model policy can typically be described in terms of routing peers, advertised IP routes etc. Routers would typically act as the border elements where such policies change between networks. Network address translators (NATs) act as border elements to connect two or more non-routable address domains. Firewalls implement policy control (for layer three and above) as border elements where the administrative control changes. The application layer typically uses flows at lower layers as well (for example, in the network layer and the transport layer). Control of the application layer potentially allows control of microflows at lower layers. For example, individual media streams for SIP calls having identical layer three characteristics may be subject to different policies. Session layer border control (SBC) allows other border elements (like routers, NAT/Firewalls, and quality of service brokers) to understand these microflows and provide the appropriate policy on a more granular basis. As a stand-alone element, an SBC simply allows policy control at the application layer.

The seven layer OSI model is defined as including a physical layer as layer one, a data link layer as layer two, a network layer as layer three, a transport layer as layer four, a session layer as layer five, a presentation layer as layer six and an application layer as layer seven.

Session Control—Session control refers to policy control at the application layer. Session control may be applied at the border of a network or inside the core of the network. The controlled element may be a NAT/firewall or a quality of service broker or router or a media resource (like a transcoder or media server). In addition to the policy control exerted by the controlled element, a session controller can allow control of the session in two fashions: "hop to hop" (also called peer level) or "end to end", depending on how the policy is being managed. Privacy; security; topology screening; Authentication, Authorization and Accounting (AAA); and law enforcement assistance (CALEA, Communications Assistance to Law Enforcement Act) are some of the session control functions.

Call Routing—Call routing is the use of layer five (of the seven layer OSI model) parameters (like DNIS, ANI, H.323 ID, Trunk group, CIC) to select layer three terminations for a call.

Call Translation—Translation of incoming layer five parameters (like DNIS (dialed number identification service), ANI (automatic number identification), trunk group, H.323 ID, CIC (call inquiry command) before handing over a call to an egress entity. Hand-over is specific to destinations and does not affect the process of call routing.

Source selection—A session controller can assign policy to calls using layer three and layer five information. Source selection happens when such assignment happens at the ingress call peer. Source selection allows an administrator to provision policy which is common to a source call-peer at a single place in the database.

Realm—A realm is one of several logical grouping of endpoints provided by the multi protocol session controller. Compared to other grouping mechanisms (like i-edge groups, zones, etc.), a realm allows the multi-protocol session controller to provide a separate logical signaling address for both session initiation protocol (creating a virtual SIP server) and H.323 (creating a virtual H.323 gateway and gatekeeper). This allows the multi-protocol session controller to layer the realm groups on top of layer three private networks.

Subnet—A subnet is an IP (Internet protocol) subnetwork inside a realm

Call Peer—A call peer is a logical grouping for calls. Call peers may be static (created by the administrator) or dynamic (created at runtime by the multi-protocol session controller). A call peer must belong to a single device and may belong to one or more call peer groups. There are two kinds of call peers: an ingress call peer and an egress call peer, as defined in the following.

Ingress Call Peer—An ingress call peer is a call peer which is associated with the incoming of a call.

Egress Call Peer—An egress call peer is a call peer which is associated with the outgoing of a call.

Call Peer Group—A call peer group is a (logical) grouping of call peers based on policy (business policy, for example, service level assurances or allocation of enterprise resources), for example, sites or peers.

Device—A device is a collection of call peers. A device may be static (have a fixed binding between call peers and a layer three address) or dynamic (when protocol registrations are to create the binding between call peers and layer three addresses). A dynamic device may have static or dynamic call peers. A static device only has static call peers.

Template—A template is a rule set used for dynamically managing devices and call peers, such as subnets.

IWF—SIP/H.323 Inter-working Function

A-O-R SIP—Address of Record (RFC 3261)

AAA—Authentication, Authorization and Accounting. These refer to the three functions performed for every call to authenticate a user's phone call, authorize the user to utilize resources in the network and account for the resource usage.

SUMMARY OF THE INVENTION

The present invention provides infrastructure such that network operators can enable their services to be delivered to other network operators, to other enterprise customers, as well as to residential customers. This includes carrier-carrier peering, carrier-enterprise peering, and carrier-residential peering, respectively.

The present invention provides a system that includes session controllers for packet switched voice telecommunications, including a multi-protocol signaling switch and a multi-protocol session controller, and a comprehensive management system for the session controllers. The management system is able to provision information into the session controllers, as well as to report on the operation of the session controllers.

A family of session controller (SC) products is preferably provided along with a comprehensive management system for the session controllers. The management system is able to provision information into the session controller, as well as to report on the operation of the session controller.

When incorporated into an overall architecture of the network, the session controller typically processes calls and, hence, participates in all calls that flow through it. Every call processed by the session controller produces a call detailed record (CDR) that is stored locally on the session controller until it is securely and reliably transported to operations support systems (OSS) and/or to the management system. The management system also receives a copy of every call detailed record produced. An analytics engine (AE) of the management systems processes the call detailed records to produce engineering reports, generate alarms and exceptions, and to produce routing rules for the session controller based on business policy.

BRIEF DESCRIPTION OF THE DRAWINGS

FIG. 7 is a block diagram of a system for simultaneously deploying session and border control;

FIG. 8 is a block diagram of a session control architecture;

DETAILED DESCRIPTION OF THE PREFERRED EMBODIMENTS

Figure 1:
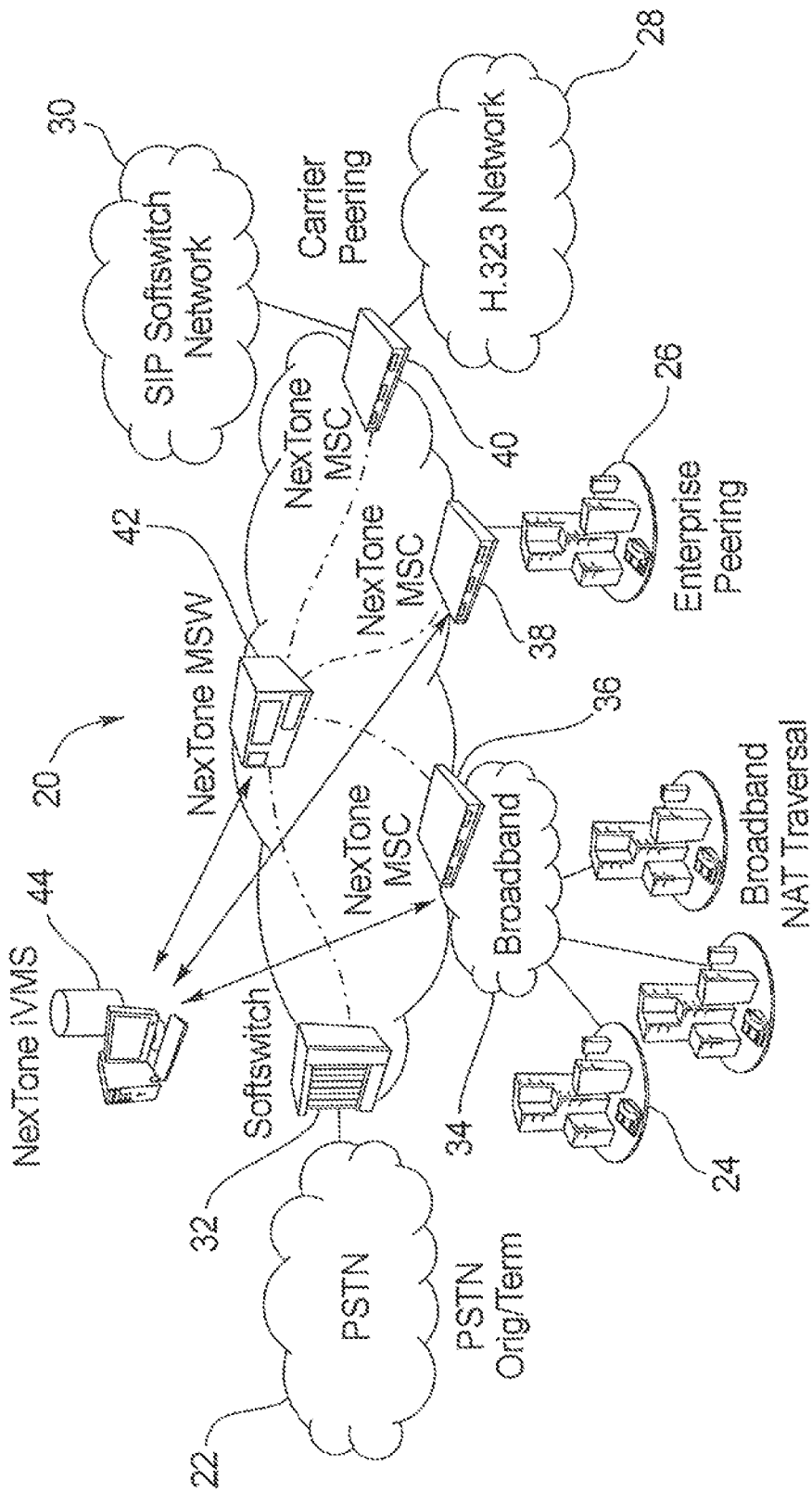
FIG. 1 is a schematic representation of a telecommunications system architecture according to the principles of the present invention.

FIG. 1 illustrates an overall network architecture of a system using session controllers and a management system of the present invention to provide voice over Internet protocol telephone service. The term voice over Internet protocol (VoIP) includes not only voice communications but also includes fax data, multimedia data and other real time or near real time services. These services may also be known collectively as media calls. The system, denoted generally at 20 in the figure, provides an interface between a public switched telephone network (PSTN) 22, a broadband network address translator (NAT) traversal 24, enterprise peering 26, an H.323 network 28, and a session initiation protocol (SIP) softswitch network 30. By way of explanation, the public switched telephone network 22 is the traditional public telephone system using circuit switched voice networks. An H.323 network 28 refers to a network utilizing H.323 standards for packet-based transfer of information, including voice transmissions, and in particular to the interface between the circuit switched voice transmissions and the packet switched voice transmissions. For example, the H.323 network may be the Internet. A softswitch network refers to a network using switches in which there is a separation of the network hardware from the network software. The SIP softswitch network and H.323 network utilize carrier peering. Peering refers to the exchange of information via nodes in a network without a central controller using the same protocol layer as other units in the communication system. Enterprise peering refers to such communications within an enterprise.

The public switched telephone network 22 interfaces through a softswitch 32 to the system 20. The interface between the broadband network address translator (NAT) traversal 24 and the system 20 is via broadband system 34 and a multi-protocol session controller (MSC) 36. The enterprise peering system 26 communications through the present system 20 via a multi-protocol session controller (MSC) 38. A single multi-protocol session controller (MSC) 40 is provided for the H.323 network 28 and the session initiation protocol (SIP) softswitch network 30.

Within the system 20, the multi-protocol session controllers 36, 38 and 40 and the softswitch 32 communicate with a multi-protocol signaling switch (MSW) 42. The multi-protocol signaling switch 42 and the multi-protocol session controllers 36, 38 and 40 are controlled by a management system 44. The management system 44 is operable to provision information into the session controllers 36, 38 and 40, as well as to report on the operation of the session controllers. The session controllers 36, 38 and 40 process calls and participate in all calls that flow through the respective session controller. The calls processed by the session controllers 36, 38 and 40 are documented in a call detail record (CDR) that is stored locally on the session controller and is transmitted to the management system. The management system also receives a copy of every call detail record produced by each of the session controllers and processes the call detail records to produce engineering reports, generate alarms and exceptions, and produce routing rules for the session controller based on business policy.

The session controllers process calls that are either at the edge of the network, or at the core of the VoIP network. If a session controller is placed at the edge of the VoIP network, peering with other networks, then the function is called border session controller (BSC) or session border controller (SBC). A session controller at the core of the network provides functions such as call routing and aggregate call admission control (CAC) and is referred to as a core session controller (CSC).

The multi-protocol session controllers 36, 38 and 40 can act either as the core session controller or as the border session controller in a network. The following briefly describes the functions that are supported.

In a deployment of a session controller as a core session controller, for example, the controller performs call routing and serves as a hunting engine. When deployed as a core session controller, it also functions as a core call controller, wherein all calls are routed through the multi-protocol session controller. The multi-protocol session controller 36, 38 and 40 identifies calls which need external feature and application servers. Further, the multi-protocol session controller 36, 38 and 40 can act as the session initiation protocol (SIP) outbound proxy for endpoints accessing services on an application server. Another function performed is authentication, authorization and accounting (AAA), wherein the multi-protocol session controller 36, 38 and 40 can enable authentication, authorization and accounting using a remote authentication dial-in user server (RADIUS). Local password authorization and call detail record logging can also be used. The core session controller also performs core network call admission control, such as regulating network capacity. The multi-protocol session controller 36, 38 and 40 exchanges telephony routing information protocol (TRIP) messages with other domains to advertise and learn routes. Lastly, the multi-protocol session controller can act as the 3GPP S-CSCF (Third Generation Partnership Project Service Call Session Control Function).

In a second deployment scenario, the session controller functions as a border session controller where it performs topology hiding. The multi-protocol session controller 36, 38 or 40 can be engaged in inter-working function calls, typically between SIP (Session Initiation Protocol) and H.323 networks. This is because the multi-protocol session controller 36, 38 or 40 can connect to the various access networks which have H.323 entities in them. The conversion between SIP and H.323 is referred to the inter-working function (IWF). The inter-working function is well known for voice calls. The present session controller includes an inter-working function for video calls. In particular, the present session controller has support for video calls between H.323 endpoints and SIP endpoints, as well as having such inter-working function support for voice calls.

The multi-protocol session controller 36, 38 or 40 will also be providing interoperability functions in the network. The controller performs access network call admission control, such as bandwidth control. For networks directly registering to it, the multi-protocol session controller can enable call screening and user authentication. The multi-protocol session controller 36, 38 or 40 can use RADIUS (Remote Authentication Dial-In User Server) or DIAMETER (a protocol similar to RADIUS, for authentication, authorization and accounting) based SIP (Session Initiation Protocol) authentication.

An additional function of the multi-protocol session controller 36, 38 or 40 is to control media flows between the access networks. The multi-protocol session controller provides far-end network address translation traversal for the access network. The multi-protocol session controller can provide transcoding services in the network for calls going out to the access network. The transcoding media server resources may be centralized in the network or co-located with the multi-protocol session controller (for example, at the border). The multi-protocol session controller also acts as the interception related information (IRI) intercept access point and content intercept access point for CALEA (the Communications Assistance for Law Enforcement Act (of 1994)). Additionally, the multi-protocol session controller 36, 38 or 40 provides monitoring for call jitter and for the mean opinion score for the media streams.

Quality of service monitoring is performed by the border session controller, wherein the multi-protocol session controller acts as a Diffserv (differentiated services) border element. The differentiated services code point (DSCP) is controllable on a per call basis. The multi-protocol session controller also takes care of inserting and/or modifying the virtual local area network tags and priority bits. The virtual local area network tags are controlled on a per realm basis and the virtual local area network priority values are controlled on a per call basis. The controller also provides the 3GPP (Third Generation Partnership Project) proxy call session control function (P-CSCF), the interrogating call session control function (I-CSCF) and the breakout gateway control function (BGCF). Lastly, as the border controller, the multi-protocol session controller can act as the SIP outbound proxy for endpoints registered to a third party application server.

All the multi-protocol session controllers (both the border controllers as well as the core controllers) in the network download their respective databases from the centralized partitioned database schema stored on the iVMS management system (a proprietary management system of the assignee of the present application). For accounting purposes, the multi-protocol session controllers can also be integrated with a RADIUS server (Remote Authentication Dial-In User Server) for accounting. An SNMP (Simple Network Management Protocol) agent runs on the multi-protocol session controller as well as on the iVMS management system.

Figure 2:
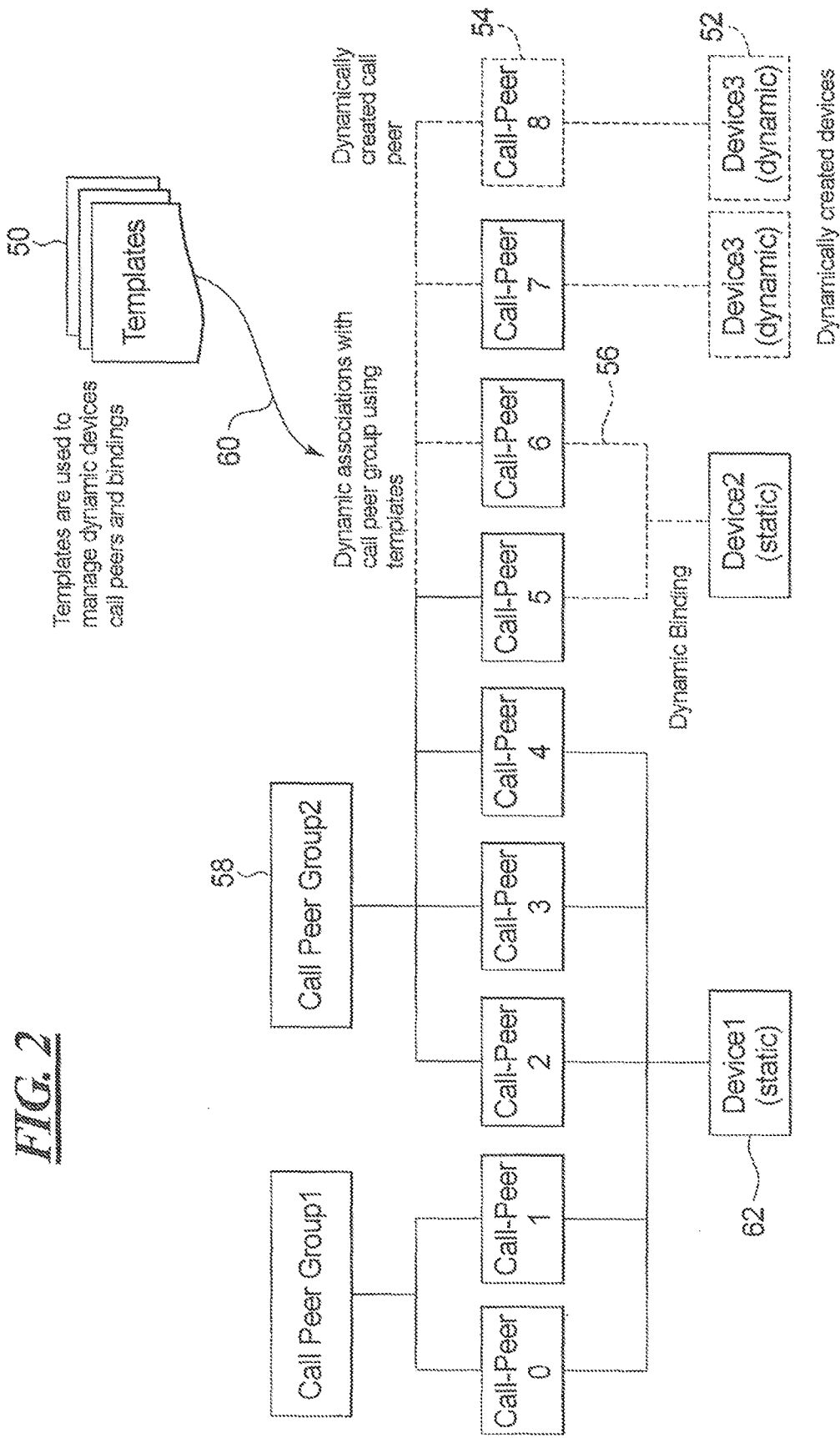
FIG. 2 is a block diagram of the elements of a multi-protocol session controller policy database, including call peers, groups, devices and templates.

FIG. 2 shows the multi-protocol session controller policy database. Templates 50 are used to manage dynamic devices 52 (which are dynamically created devices), call peers 54 and bindings 56. A dynamic association with call peer groups 58 using the templates 50 is indicted by the line 60. Static devices 62 are indicated Call peers 54 are by far the most important element in the processing of a call. As mentioned above, a call peer is a logical grouping of calls, and can be either an ingress call peer of incoming calls or an egress call peer of outgoing calls. The multi-protocol session controller associates exactly one ingress call peer for each call being processed. The process of call routing ensures that exactly one egress call peer can be associated with the call.

Figure 3:
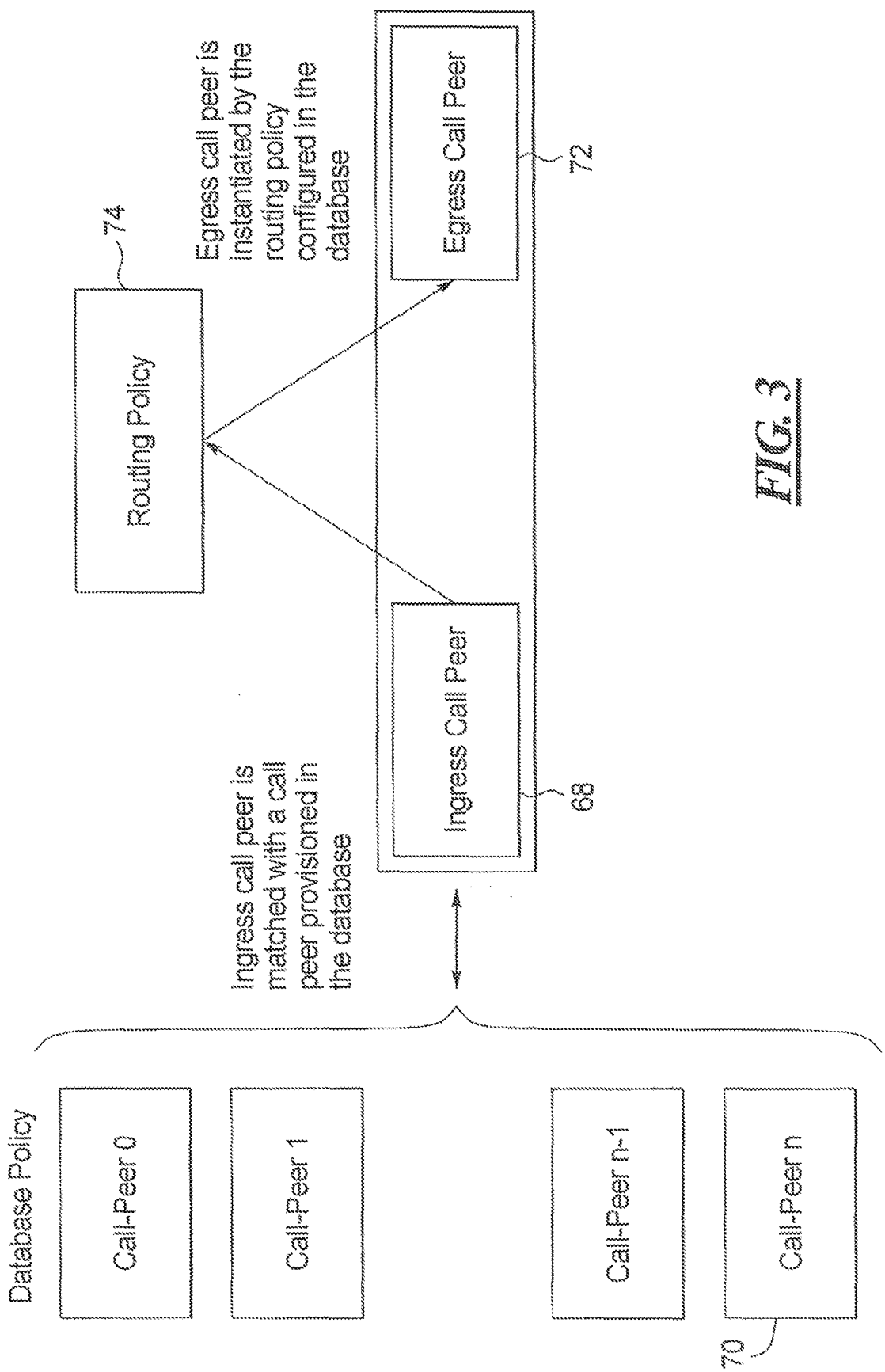
FIG. 3 is a block diagram showing the association of one ingress call peer and one egress call peer in the call routing process.

FIG. 3 shows this conceptually. The incoming or ingress call peer 68 is matched to a call peer 70 provisioned in the database. The ingress call peer 68 is instantiated by the multi-protocol session controller by mostly looking at the protocol message which triggered the call/session processing. Information at layers three through seven of the OSI seven layer model is analyzed to create this instantiation. The outgoing or egress call peer 72 is instantiated by the routing policy 74 configured in the database. In particular, once the ingress call peer 68 is created, the multi-protocol session controller looks for a match for this call peer in the database (or policy). If a match is not found, the call may still be accepted if access control has been disabled. Under normal configuration, however, such calls are dropped. The process of call routing loops through the database and instantiates the egress call peer 72 for the call leg. The multi-protocol session controller may not be able to associate an egress call peer 72 for a call leg if resources are not available or user policy prevents it. Under such circumstances the call is rejected.

As an intermediate system that does not originate or terminate phone calls, the present system sits in the path of the phone call and switches the call. Each call has two call legs, an incoming call leg and an outgoing call leg when seen from the intermediate components.

The process of matching an ingress call peer 68 with one provisioned in the policy 74 depends on how call peers, devices and templates are defined. The matching process results in the allocation of the ingress call peer 68 with a call peer defined in the database and hence allows the latter to define policy on groups of calls.

Figure 4:
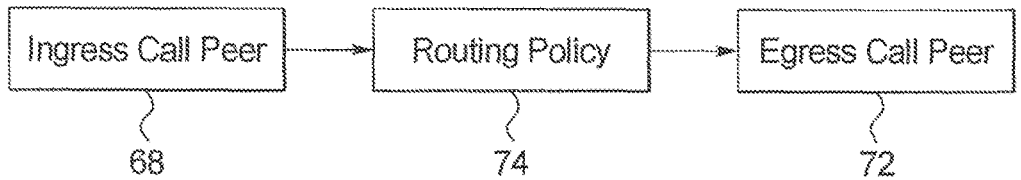
FIG. 4 is a block diagram of a database policy model for the call routing process.

In the following, it is assumed that the term call peer refers to the call peer defined in the database. The process of call routing is simply represented in FIG. 4.

Some examples of call peers 68 are: calls identified by the called party number (or pattern) or the calling party number (or pattern); calls originating from a single signaling entity, for example an H.323-ID or an address-of-record; or calls already grouped by trunks groups.

A device contains one or more call peers (and contains at least one). The containment relationship is referred to as binding. Both the device as well as this binding can be static or dynamic. Devices usually correspond to physical things in the network around the multi-protocol session controller, such as gateways, terminals, gatekeepers, multi-port conferencing units (MCUs), conferencing servers, private branch exchanges (PBXes), proxy servers, etc.

The association of a call to a device is not a hard and fast rule. The following restrictions do apply. Each registration must correspond to a unique device. The multi-protocol session controllers will not allow a device to register successively or in multiple registration messages. This simplifies registration management, caching, and timeouts of devices which use registration.

A registration activates all call peers on a device which uses registration. Until the first registration arrives, the call peers, device and the bindings are considered disabled.

Examples of device-based identification criteria used by the multi-protocol session controllers are: the resolved value of the via address in the first session initiation protocol (SIP) INVITE (identifying the previous hop proxy—hop to hop identification); the resolved value of the contact uniform resource identifier (URI) in the first SIP INVITE or source signaling address in the H.323 SETUP (identifying the previous hop back to back user agent or the end user agent/endpoint/gateway—end to end identification); and the source IP (Internet protocol) address of the incoming SIP INVITE or H.323 SETUP (identifying the previous hop network address translation or middlebox).

A call peer group 58 allows multiple call peers to be part of a common policy specification.

The templates 50 have multiple functions. In particular, templates 50 function as rule sets which govern the application of policy to devices and to call peers which are not explicitly provisioned on the multi-protocol session controller. Templates 50 function as rule sets which govern the application of policy to devices which register with the multi-protocol session controller. Both of these functions are explained in detail hereinafter.

For every call, the existence of the call peer at ingress allows the following functions to be performed.

Call admission control is based on call legs or bandwidth. If access control is enabled and no ingress call peer is found or no template exists which allows the creation of a call peer dynamically, the call is rejected. If a call peer is found, call legs and bandwidth used are compared against limits.

The call peer at ingress also permits the peer to be reported in the call detail record for every call. Further, a media routing policy is provided for the call. In addition, a privacy policy for the call (SIP Privacy and 11.323 presentation and screening indicators) are provided.

The call peer allows interworking of related information for originating or terminating signaling on the peer. Specifically, the calling peer specifies what kind of signaling (SIP or H.323) is used to terminate calls on the peer (this applies to device peers, see below).

Yet another function permitted by the call peer is the specification of the class of service (in a tiered service model) for calls originating from the call peer. The class of service is specified using trunk groups, zones, call hunting timeouts and attempts, etc.

There are also limitations in some embodiment, such as the multi-protocol session controller lacks extensive support for device peers and subnet peers in the current releases. However most of these concepts are visible in the current database and policy settings. A reg-id/u-port acts as a call peer and the reg-id (registry identification) functions as the device holder. There is also no clear separation between devices and call peers. Configuration specific to devices is part of each call peer which is part of the device. For example, the IP address information is statically configured on all reg-id/u-ports which are assumed part of the same device. An i-edge group is the only call peer group defined.

Further, the multi-protocol session controller does not require explicit provisioning of devices and call peers. In the scenario where SIP user agents access services on a third party SIP server using the multi-protocol session controller as the outbound proxy, the multi-protocol session controller does not require the user agents to be explicitly provisioned as call peers or devices. These devices must register with the server and the multi-protocol session controller creates dynamic devices and call peers based on these registrations. The multi-protocol session controller also instantiates policy for these dynamic devices/peers using templates. In this case, templates 50 (based on subnets) may be used to dictate creation of these dynamic call peers and devices and their association with i-edge groups. Each template has a reg-id/u-port.

Gateways/user agents may sometimes be moved (providing mobility). The multi-protocol session controller detects mobility only via registrations. Mobile devices may be registered (and hence configured) on the multi-protocol session controller or a third party server. Templates 50 govern the instantiation of policy on both cases.

In the following is described the policy configuration on a call peer.

The multi-protocol session controller policy and configuration parameters on each call peer are assumed to be in four broad categories. The categorization is two ways, namely IN, representing parameters which apply for incoming calls or those defined on an ingress call peer, and OUT, representing parameters which apply for outgoing calls or those defined on egress call peers. Within each of these categories there are two categories, namely MATCH, parameters which are used for matching calls (These may be protocol parameters, layer three (network) parameters or application aliases.), or SET, parameters which are used for modification of call parameters (These may be protocol parameters, layer three parameters or application aliases.).

The use of these parameters is explained further in the call routing section. The IN/MATCH parameters function to associate a call with an ingress call peer. When the same parameter is associated with multiple categories, for example IN/MATCH as well as IN/SET, it is assumed to be a unique instance of the parameter in each category which is unrelated to other categories.

Dynamic call peers are call peers that are created dynamically by the multi-protocol session controller when acting as the SIP outbound proxy. This is explained later in this specification.

The following describes use cases involving templates.

In an example including mobility, network address translation (NAT) and outbound proxy (OBP), a mobile endpoint registers with an address in subnet1. The endpoint is always behind a network address translator (NAT) (along with several other similar endpoints) and is registering with a third party SIP server through the multi-protocol session controller. The endpoint later moves to subnet2. In this case, the multi-protocol session controller creates a device and call peer dynamically for each registration and applies a subnet specific policy to instantiate the call peer. Each such endpoint behind the network address translator has a unique reg-id (registry identification) that is dynamically generated by the multi-protocol session controller.

In an example that is the same as above with the exception of the outbound proxy, the endpoint is registering with the multi-protocol session controller. In this case, the user has a predefined reg-id (registry identification) for the endpoint. Templates based on subnets govern policy instantiation when the endpoint moves.

In another example, a gateway within a subnet attempts to make a call. Subnet based templates allow the multi-protocol session controller to associate a call peer as well as a call peer group with the call.

Figure 5:
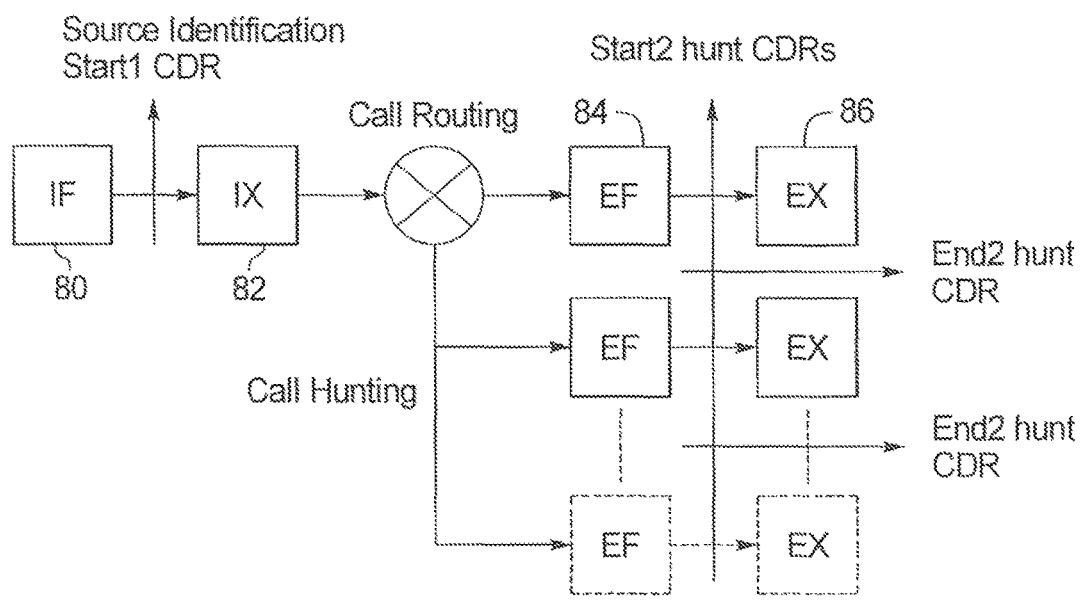
FIG. 5 is a block diagram of call routing on a multiprotocal session controller.

The call processing algorithm, or method, used by the multi-protocol session controller as shown in FIG. 5 includes four steps. In Step 1, labeled IF, reference number 80, filter the call on the ingress (using the IN/MATCH parameters above). In Step 2, labeled IX, reference number 82, translate the call on the ingress (using the IN/SET parameters above). In Step 3, labeled EF, reference number 84, filters the call on the egress (using the OUT/MATCH parameters above). In Step 4, labeled EX, reference number 86, translates the call on the egress (using the OUT/SET parameters above).

In further detail, step 1, 80, is the process of source identification and applying common source policy. Steps 2 and 3, 82 and 84, together accomplish "routing" of the call. Step 2, 82, is also called tagging and step 3, 84, is called matching. Thus, routing is the combined process of tagging and matching Step 4, 86, accomplishes hand-off of the call.

All steps except step 3 (routing) are optional. Generally, there are two kinds of calls. The first type of call includes calls which are directed to a specific endpoint (for example, to an address of record, a particular phone or to a particular H.323 identification). These calls execute step three only and are referred to as direct end point calls. The second type of calls includes calls which require call hunting on the multi-protocol session controller. Call hunting is the process by which the multi-protocol session controller finds the best possible destination among an identified group of destinations for the call.

Call hunting uses the following criteria: filter priority; call-peer priority; filter match strength; administration policies on call-peer or filter (like time of day filtering); load balancing (least recently used or percent utilization); and run time criteria like ISDN/SIP response codes/redirects, etc. Similarly, source identification uses the following criteria: filter priority; call-peer priority; filter match strength; and administration policies on call-peer or a filter (like time of day).

The control of error codes returned by the multi-protocol session controller is as follows. Both SIP and H.323 calls use several error codes to signal why a call is dropped. The multi-protocol session controller allows control of the call hunting process based on the error codes and the mapping of the error codes when they are returned back to the caller. Generally, an error code can be interpreted: as a stop (wherein no more attempts are necessary for the call and the multi-protocol session controller also uses this interpretation for direct end point calls which fail); as a temporary failure (keep trying); or as a redirect (try the attached list of destinations).

Figure 6:
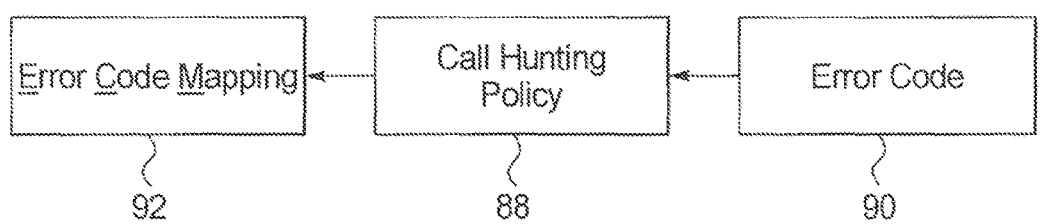
FIG. 6 is a block diagram of an error code handling process.

FIG. 6 illustrates the error code handling process.

The call hunting policy 88 is applied before the error code 90 is mapped 92 and sent to the caller. No error code mapping 92 is done for direct end point calls. The multi-protocol session controller uses a default policy on how the error code is used by the call hunting policy. By default, no error code mapping is applied unless protocol inter-working is necessary. The inter-working error code map is also defined as part of the full error code map on the in or ingress peer (device peer).

The following describe call routing and hunting. The policy described above enables the following modes of routing:

Automatic number identification (ANI) based routing: The multi-protocol session controller is capable of doing automatic number identification based routing in a multitude of ways. If the ANI policy is specific to a call origination, but common to all terminations, then the IN/MATCH parameters are used to filter the automatic number identification at the ingress (Step 1 of call routing above). The call is tagged (Step 2). This tag is used as the filter for the OUT/MATCH step which follows. The tag applied in the call tagging step is filtered (this is the step 3 of call routing). Translations may be applied as part of Step 1 and Step 4 in call routing.

If the automatic number identification policy is specific to a call termination, but common to all originations, then the OUT/MATCH parameters are used to filter the automatic number identification at the egress (Step 3 of call routing). Translation may be applied as part of step 4 in call routing.

The multi-protocol session controller can use the automatic number identification to identify the true origination of the call. For example, in the scenario where the multi-protocol session controller functions as a session initiation protocol outbound proxy, a call originated by an endpoint registered to a session initiation protocol server may get hair-pinned through the multi-protocol session controller. The hair-pinned instance may have no session initiation protocol headers in common with the original call coming in (for example where the session initiation protocol server is a back to back user agent). For such a call, the multi-protocol session controller can use the automatic number identification as a selector identifying the true access network originating the call. In this way, if the call is destined towards any public switched telephone network gateway registered to the multi-protocol session controller, the policy can be selected based on the originating access network. Automatic number identification based call routing can also used by the multi-protocol session controller on calls coming in from the access networks themselves to determine if they need any application services. Calls which do not need application services may be directly routed to other registered endpoints (such as the public switched telephone network endpoints).

In trunk group based routing, the trunk groups can be used on the multi-protocol session controller in a multitude of ways. First, an origination can specify a termination policy by providing the multi-protocol session controller with a trunk group identifier. Second, for class of service, the tagging step in call routing process can be used to tag calls based on a required class of service. Thirdly, partitioned routing or interconnects is used somewhat like a dumb patch panel, where a call origination is connected with one or more terminations. Fourthly, for simple automatic number identification or dialed number identification service based routing, using the filtering mechanism (step 1 of routing), calls can be tagged based on automatic number identification or dialed number identification service. Step 3 then chooses a termination based on these tags.

All call-peer ports can be placed into zones. A caller which is in zone A is allowed to speak only to other parties in the same zone.

Control of the call hunting process is provided in the multi-protocol session controller. In particular, control specific to call origination (characterizing policy applied to a call source) is provided. This includes the maximum number of attempts allowed for a call source and a maximum post-dial delay specified for the source. The post-dial delay (PDD) timer may also expire when a destination responds with a call proceeding or a 100 trying. 100 trying is a SIP message code formatted according to RFC822. In this case, the multi-protocol session controller will abandon the call attempt.

Further, the multi-protocol session controller controls the call hunting process by providing that any Internet control message protocol (ICMP) destination that is unreachable may be coming in response to a pending request (both SIP and H.323).

Another mechanism for control of the call hunting process provides for a hunt timeout specified on a destination basis (SIP and H.323). This timeout determines when the multi-protocol session controller considers an attempt failed and tries the next alternate route.

As a further control of call hunting, sticky routes are used. A sticky route is defined as the last route used in the call hunting process. In essence it is used to terminate the call in case the attempt which uses the sticky route fails. Sticky routes function as good exception mechanisms to a general hunt process and allow a call termination to determine and terminate the call hunting algorithm.

Filters and Translations which are common to all calls can be applied as part of transit routes (special kind of routes).

The multi-protocol session controller interacts with an external application server.

For endpoints that are registered directly with an application server, the multi-protocol session controller directly hands off calls to the application server. The application server may direct the call to a voice mail server (which may pass through the multi-protocol session controller) or to another registered endpoint through the multi-protocol session controller (hairpin).

The multi-protocol session controller also creates a dynamic endpoint state for each registration destined to the application server. The dynamic state is created on the realm which the registration comes on and all calls originating from and terminating to these endpoints assume the media routing characteristics of the realm.

The multi-protocol session controller also uses the session initiation protocol mirror proxy functionality to achieve the same. The multi-protocol session controller will allow assignment of a mirror proxy on a call-peer basis.

The multi-protocol session controller routes registrations and calls for all endpoints using the mirror proxy functionality to their respective mirror proxy (provisioned at the source of call identified by the multi-protocol session controller).

The multi-protocol session controller also functions as a session initiation protocol (SIP) outbound proxy. The concept of the outbound proxy is defined for the SIP protocol only and applies to calls or services being accessed off a third party SIP server using the multi-protocol session controller as an intermediate element.

An ingress session initiation protocol call/registration is classified by the multi-protocol session controller into two categories. First, the multi-protocol session controller serves as the proxy/registrar. In this case, the call/registration is accessing authentication/routing services of the multi-protocol session controller. A request for a uniform resource identifier for registrations must be addressed to the multi-protocol session controller. However, request for a uniform resource identifier for calls may not be addressed to the multi-protocol session controller. The multi-protocol session controller also processes SIP 3xx messages locally without passing them on to the caller.

Second, the multi-protocol session controller serves as the outbound proxy. For a registration, the request uniform resource identifier is addressed to a third party SIP server. All calls coming from such endpoints and not addressed to the multi-protocol session controller are treated as outbound proxy calls. Calls addressed to the multi-protocol session controller are still routed as in the proxy mode above. The multi-protocol session controller always relays all SIP final responses (including the 3xx message codes, which relate to redirection responses of the SIP messages) back to the caller in this case. As a consequence of this, no hunting services are provided on the multi-protocol session controller as well. (This is to make sure authentication works properly on each hunt attempt as well as that there is no undue effect on the hunting algorithm implemented on the external server).

As described above, the multi-protocol session controller has the ability to act as a SIP outbound proxy in both the border as well as core of the session control. A border controller acting as the SIP outbound proxy would forward registrations and signaling messages directly to the end server. Location of such an end server (using a domain name server (DNS), for example RFC 3263) is typically hidden from the endpoints using the multi-protocol session controller as the outbound proxy. The multi-protocol session controller can also employ call hunting to hunt through a locally configured list of servers as part of the location process. Processing of SIP 3xx redirect message codes is also executed on the multi-protocol session controller.

The multi-protocol session controller can treat a call as an outbound proxy call in two ways. The first way uses SIP request—uniform resource identifier based forwarding for calls from endpoints which are registered with a third party registrar. In this method, the end system accessing the SIP server is aware of the existence of the multi-protocol session controller as the outbound proxy. This method is advisable when the multi-protocol session controller executes the core session control function (as a core controller). The second way uses mirror proxy functionality on the multi-protocol session controller. In this method, the end system accessing the SIP server presumes that service is provided by the multi-protocol session controller. Note that the mirror proxy functionality only applies to endpoints which are registered. The multi-protocol session controller forwards all registrations and signaling messages transparently between the end system and the server. This method is preferable when the multi-protocol session controller executes the border session control function (as a border controller). The mirror proxy functionality allows more control by the administrator over non-conforming SIP endpoints.

FIG. 7 illustrates a scenario where border control and core session control are not on the same element, both methods may be simultaneously deployed in the system. In particular, the border controller 100 deploys a proxy to the core controller 102 that in turn provides the proxy to the application server 104.

A mirror proxy may be deployed on the border controller. A request—uniform resource identifier based forwarding is deployed in the core. Call hunting is also executed at the core.

The following discloses the creation and management of dynamic peers.

The multi-protocol session controller uses dynamic peers (also known as dynamic endpoints) to manage registrations and calls for user agents which register with a third party registrar. Both the device and the call peer are created and managed at runtime. The following steps describe how this state is managed.

In the first step, the state is created on a successful registration when the registrar returns a 200 OK. The 200 OK refers to the SIP message code indicating that the response has been successfully processed. A temporary state is maintained while the registration is in progress. The profile used to create the dynamic call peer and device may vary depending on whether a template is discovered for it or whether defaults are being used.

In the second step, the state is refreshed on every registration. The multi-protocol session controller maintains a timeout based on the 200 OK message sent back for a register. If the endpoint does not refresh, it is deleted.

In the third step, the state is deleted on an unregistration.

In the fourth step, the multi-protocol session controller always assigns a timeout value (in response to a 200 OK message) which is the minimum of the locally configured value and that assigned by the registrar.

In the fifth step, the network address translation state is stored in the dynamic device and maintains signaling information for routing calls back to the user agent.

In the sixth step, an implicit access control may be enabled for all dynamic call peers by limiting the previous hop for routing calls to the user agent. The multi-protocol session controller allows the previous hop to be open or restricted to the proxy/registrar to which the endpoint registers.

In the seventh step, the uniform resource identifier with which the user agent can be accessed on the multi-protocol session controller is of the form: user@MSC-Realm, where the registration is for user@proxy.

In the eighth step, each dynamic call peer and device corresponds to a unique session initiation protocol registration and has a unique reg-id (and a port of zero). This allows the user agent to be mobile from one network to another, especially when there is a network address translation between the user agent and the multi-protocol session controller.

In the ninth step, a dynamic endpoint belongs to the realm on which the registration arrives. When the endpoint moves and the realm changes, the multi-protocol session controller will update it on the next successful registration.

The templates provide the following functionality. A dynamic call peer is created when the third party session initiation protocol registrar responds with a 200 OK message for the registration. An administrator may associate policy which applies to these dynamically created peers. For example, depending on which subnet the registration originates from, it is within the scope of the invention to associate calls coming from these devices to a site specific media or call admission control policy. When a template is not found, the multi-protocol session controller preferably creates the device and call peer using default parameters.

Templates have two main functions. The first is assignment of policy to inactive devices and the bound call peers based on registration information. The second is assignment of policy to non-existent devices and call peers based on registration information.

For example, a template can contain a subnet IP address and mask as its IN/MATCH criteria. On the first registration from this subnet, there are two possibilities:

The call peer is located and holds the registration alias. In this case, the multi-protocol session controller may use the templates IN/SET and OUT/SET parameters to modify the existing parameters on the device and call peers. This would be used, for example, in case a user agent moves from one subnet to another and the system applies a new media routing policy to calls coming from it.

When a call peer is non-existent as well as the device then the multi-protocol session controller would use the IN/SET and OUT/SET parameters to instantiate the call peer and device. The IN/MATCH and OUT/MATCH parameters would be initialized by the multi-protocol session controller based on the protocol parameters and state created. This would be used, for example, when session initiation protocol user agents are registering to a third party session initiation protocol server. The OUT/MATCH parameter in this case would be the session initiation protocol A-O-R=user@MSC-Realm. The IN/MATCH parameter would be the session initiation protocol contact address=user@Private-Address and is used to group calls coming from the user agent.

The present multi-protocol session controller (MSC) also addresses billing issues. The multi-protocol session controller can function as the central point in the network which routes all calls. Call detailed records are produced for each call and logged using ASCII/RADIUS. For calls (identified by Call ID or Callid) which are hairpinned by an application server (AS), the call flow appears as follows:

Callid1→MSC→Callid2→AS→Callid3-+MSC→Callid4

The call detailed records (CDRs) produced for such a call are as follows:

CDR1 (on MSC): Callid1, Callid2
CDR2 (on AS): Callid2, Callid3
CDR3 (on MSC): Callid3, Callid4.

Extra CDR desired: Callid1, Callid4. All of these call detailed records are desirable to be able to debug and account for all call legs.

To mediate the call detailed records to be able to produce a single call detailed record, several approaches can be taken. The multi-protocol session controller can implement the IMS charging ID (3GPP) and insert it as part of the P-Charging-Vector (RFC 3455). The application server must support this header and relay it back to the multi-protocol session controller. This is the best solution. Unfortunately, it requires that the application server (which will be a back to back user agent in most cases) pass this header on, unmodified. In this case, the multi-protocol session controller will specially mark CDR1-3 as the intermediate call detailed record (CDR) and produce the final call detailed record.

The three call detailed records can be mediated on an external system to produce the final call detailed record.

A topology hiding function is provided for all endpoints directly registered to the multi-protocol session controller. The multi-protocol session controller provides these functions for calls going between realms, calls within a realm, media flowing between realms, and media flowing within a realm (if necessary).

Under the heading of inter-working function and interoperability, the following apply. For border control, the multi-protocol session controller uses the session initiation protocol back to back user agent and the H.323 back to back gateway as the architectural components.

In FIG. 8, the session control architecture also referred to as a protocol stack, provides that the border session control function (BSCF) Policy 106 provides the border session control function (BSCF) 108. Likewise, the core session control function (CSDF) Policy 110 provides the core session control function (CSCF) 112. The BSCF 108 effects the H.323 routed gatekeeper (GK) 114, the session initiation protocol (SIP)/H.323 inter-working function (IWF) 116, the session initiation protocol (SIP) proxy/registrar 118, and the session initiation protocol (SIP) outbound proxy (OBP) 120. The core session control function (CSCF) 112, on the other hand, effects only the SIP proxy/registrar 118 and the SIP OBP 120.

The H.323 routed gatekeeper 114 accesses an H.323 gatekeeper 122 and an H.323 gateway 124. The SIP/H.323 inter-working function accesses the H.323 gateway 124 and an SIP user agent (UA) 126. The SIP user agent is also referred to using session description protocol (SDP) or SIP-T (session initiation protocol for telephony). The SIP proxy/registrar 118 accesses a back to back user agent 128 that sits atop the SIP user agent 126, as well as accessing an SIP registrar 130. The SIP outbound proxy (OBP) 120 only accesses the back to back user agent 128.

The H.323 gatekeeper 122, H.323 gateway 124, SIP user agent 126 and SIP registrar 130 form a layer that sits atop a layer formed by an H.225/H.235/H.245 component 132 and an SIP TSM component 134. The 11.225/11.235/11.245 component describes the 11.232 protocols suite, where H.225 covers narrow-band visual telephone services, H.235 concerns security and authentication, and H.245 negotiates channel usage and capabilities.

This protocol architecture provides a TCP/UDP layer 136, an IP4 and IP6 layer 138 and 140 and at the bottom a media processing layer 142.

Figure 9:
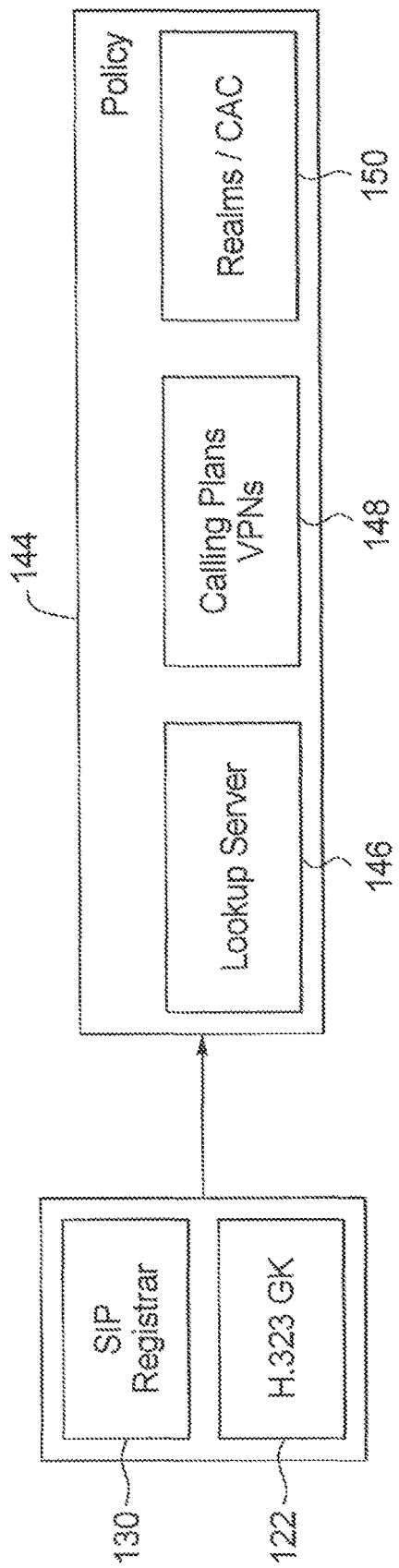
FIG. 9 is a block diagram of policy.

FIG. 9 shows the policy structure including the SIP registrar 130 and H.323 gatekeeper 122 which accesses a policy 144 including a lookup server 146, calling plans and virtual private networks (VPN) 148, and realms/CAC (call admission control) 150.

The architecture of FIG. 8 provides flexible mapping of the application as well as protocol information such as user identify (the user name and phone numbers); network topology (the host names domains) and the SIP protocol headers (including "from", "to", "privacy").

The architecture also provides full control of SIP messages, timers, state machines and call flows. This enables the issuing of messages independently of call participants and enables third party call control (3 pcc) which is used by various applications.

The architecture of FIG. 8 also provides full control of H.225 and H.245 state machines. An inter-working with early H.245, H.245 tunneling, H.323 fast connect and H.323 v1 (which are slow start calls such as those used by Cisco call manager) is provided. The inter-working with endpoints implementing the extended fast connect in accordance with H.460.6 (such as an Avaya PBX) is also provided.

The present architecture also offers flexible inter-working between SIP and H.323. Specifically, regular voice calls which use any of the above features as well as advanced services such as video can be inter-worked. Facsimile transmission such as T.38 fax inter-working is also supported.

The access network call admission control is used for call routing load balancing, rejecting calls that exceed the provisioned service level assurance (SLA), or to provide the best effort service for overflow calls. Call routing here refers to selecting the destination of the call.

The multi-protocol session controller provides an enhanced call admission control for signaling resources, including the call peers and the call peer groups, as well as for bandwidth control for the call peers and call peer groups. The signaling resources refer to the number of call legs that are active on the multi-protocol session controller.

Bandwidth measurement is not based on call legs originating from or terminating on an endpoint (or realm or subnet or i-edge group). For example, a softswitch (an endpoint) may make a call which is hairpinned through the MSC and media never leaves the endpoint. In this case, there are two call legs (an originating and a terminating call leg) on the endpoint, while the bandwidth used is zero (inter bandwidth, which we are concerned with is zero, however, intra-bandwidth would be non-zero).

The MSC provides bandwidth control even if it is not in the media path or in control of how the media flows in the underlying network. Media can either be routed directly by the MSC or controlled by using a third party media server. In a case where network topology closely resembles the logical groups created for bandwidth control (a-d above), the MSC can provide control of how bandwidth is used. For example, an administrator may have fixed network resources to route media between Subnet1 and Subnet2 and they may be connected via an MPLS network.

Figure 10:
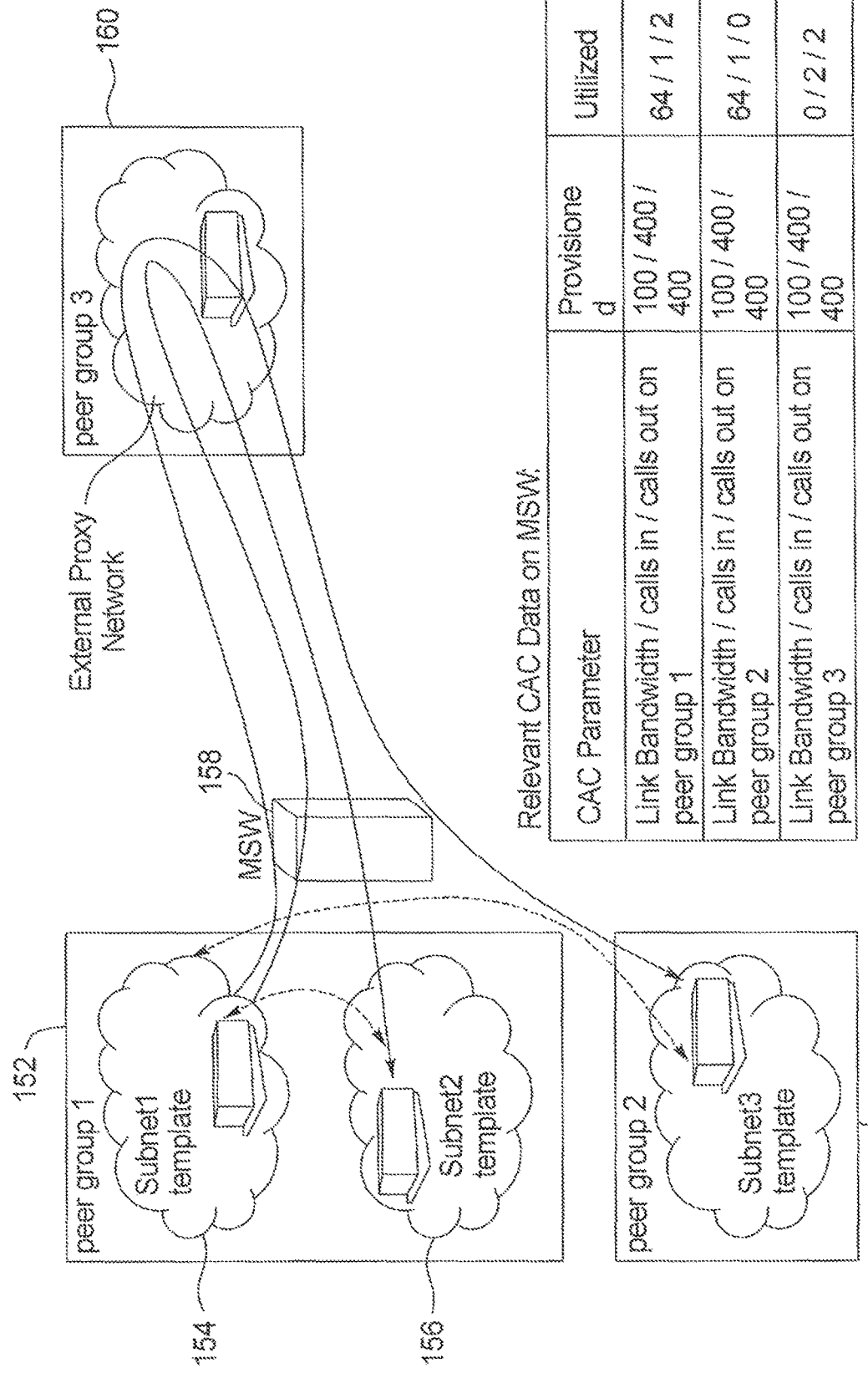
FIG. 10 is a schematic diagram of a call admission control on a peer group basis.

In FIG. 10, a peer group is used to bundle subnets and provide call admission control based on groups of subnets. Call admission control can be enforced at the peer level or at the peer group level.

The provisioning of media routing policy is provided according to an embodiment of the invention. The multi-protocol session controller allows media routing policy to be provisioned in each of the peer, the peer-group, and the realm. At each level two separate kinds of media routing policy are specified, namely intra-X media routing and inter-X media routing. Here X is one of the peer, the peer-group or the realm. The following describes these policies:

For peer policies under the intra-x media routing, the media routing policy for hairpinned calls is provided. Hairpinned calls are calls for which the originating and terminating peer are the same. For peer policies under the inter-x media routing, media routing policy for calls between this peer and the rest of the peers.

For peer group policies under the intra-X media routing, media routing policy is provided for calls where the originating and terminating peer are in the same peer group. For peer group policies under the inter-X media routing, media routing policy is provided for calls where the originating and terminating peer are in the different peer groups. For realm policies under the intra-x media routing, media routing policy is provided for calls where the originating and terminating peer are in the same realm. For realm policies under the inter-x media routing, media routing policy is provided for calls where the originating and terminating peer are in the different realms.

For each of these, the policy definition consists of two values, the policy precedence and the policy on/off. The precedence is a numerical value (integer) and a higher value implies a higher precedence.

Figure 11:
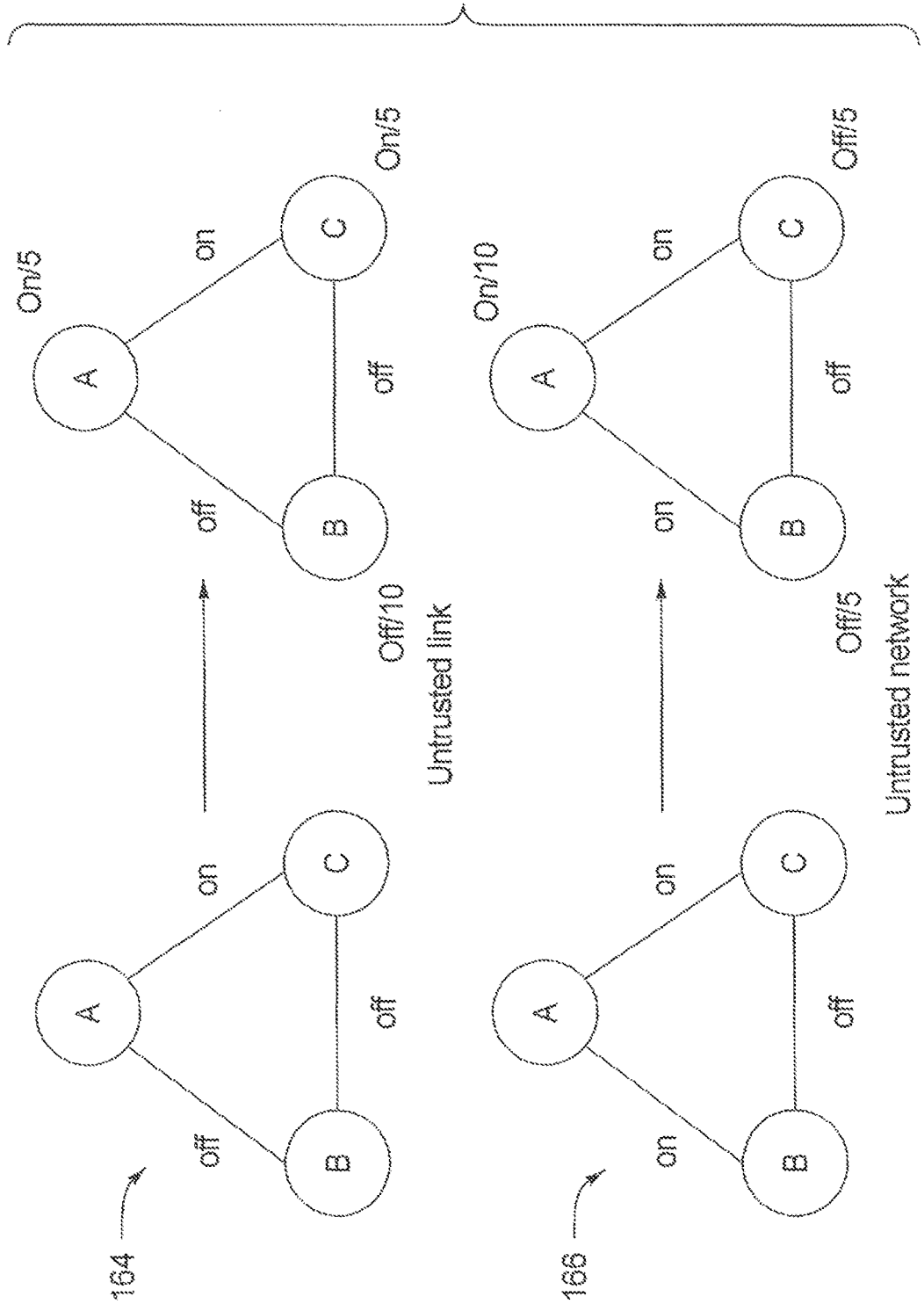
FIG. 11 is a schematic diagram of a media routing policy configuration.

In FIG. 11, for a call from peer A to peer B, the relevant policy on the source and destination peer is first determined. For example, the call may be between different peers in the same peer group but between different realms. This means that on the source as well as destination peer, the call is subject to the following policies: inter-peer MR (media routing), intra-peer-group MR, or inter-realm MR. The following hierarchy is then applied to determine the media routing policy applicable to the source or destination peer. If the peer has the media routing (MR) policy specified, it is used. If the peer-group has media routing (MR) policy specified, it is used. If the realm has the media routing (MR) policy specified, it is used.

Once the media routing policy on each peer is determined, the precedence (the integer value) is used to determine which policy wins.

FIG. 11 provides examples of media routing policy configurations. For an untrusted link (top example) 164 between peer A and peer C is on, the peers A and C are on while peer B is off. For an untrusted network (bottom example) 166 where the link between A and B and between A and C are on, the peer A is on and peers B and C are off.

Figure 12:
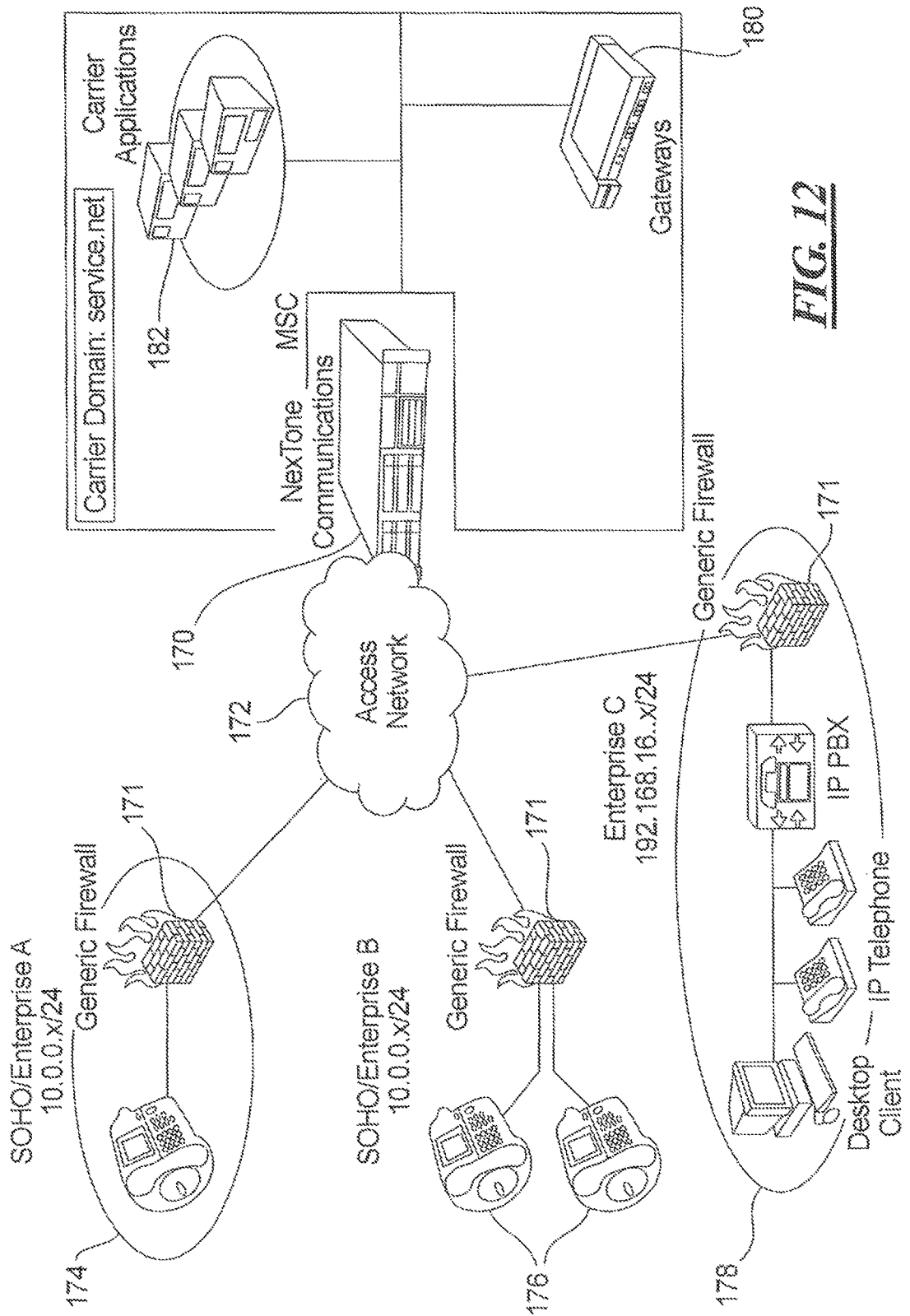
FIG. 12 is a schematic diagram of a firewall traversal on a multi-protocol session controller.

Far-end network address translation traversal is discussed hereinafter. The multi-protocol session controller 170, shown in FIG. 12, can interface with any kind of generic network address translation/firewall 171 (symmetric, full cone, restricted cone, etc) on a session initiation protocol access network 172. The network address translation/firewall may be connecting an enterprise/carrier 174, 176 and 178 to the public internet via a gateway 180 or to the private network 182 of a provider.

For all session initiation protocol request messages, the existence of the network address translation itself is detected by matching the via header to the source IP address of the message. The response to such a request is always sent back to the source IP and port from which the request came. The multi-protocol session controller also implements RFC 3581, which can be used by the session initiation protocol user agent behind the firewall to register its contact properly.

Session initiation protocol registrations are provided as follows. The multi-protocol session controller maps the contacts registered by the session initiation protocol endpoints behind the firewall to the source IP and port from which the registration comes. The multi-protocol session controller implements the following mechanism to keep the signaling pin-hole open.

If the multi-protocol session controller detects that the registration is coming from behind a network address translator, the multi-protocol session controller will tweak down the expiration timeout assigned to the endpoint. The default timeout used will be two minutes (which can be configured by the admin). Some of the considerations for adopting this approach over others are: The suggested mechanism for network address translators to refresh user datagram protocol (UDP) bindings is outbound traffic (where traffic comes from behind the firewall, going to the network address translator's public side). This is mostly for security concerns in that some hacker may attempt to keep a binding open long after it has been closed.

This method may introduce a significant higher load on the multi-protocol session controller since it requires a large number of messages and the messages to be parsed and created on the multi-protocol session controller. If the registrations are destined to an application server, they may create a lot of load on the application server too. The multi-protocol session controller will provide a filtering mechanism to turn down the frequency at which these registrations are sent to the application server. The multi-protocol session controller will also monitor these registrations to see if any of them need exception processing and need to be sent to the application server (for example, the callid (call ID) or contacts or any other registration uniform resource identifier/contact parameters have changed). The timeout on the application server side will be one day (which can be tweaked down by the application server based on the application server configuration). For example, if the application server assigns a timeout of 60 minutes, the multi-protocol session controller will end up forwarding every 30th registration given a two minute timeout on the network address translator-side.

The multi-protocol session controller may also provide a mechanism to detect the network address translation timeout using the OPTIONS packets. The OPTIONS refers to a command in a request pocket header relating to the method to be performed on the resource. Possible methods include, Invite, Ach, eye, Cancel, Options, Register, as are known. This mechanism is theoretically possible, but is not guaranteed to work deterministically given the non-deterministic behavior of network address translators. A per endpoint/subnet/realm timeout for network address translation traversal is preferred.

Static endpoints are session initiation protocol gateways which do not register are also supported. Static pinholes must be provisioned on the firewall to let inbound signaling through.

Figure 13:
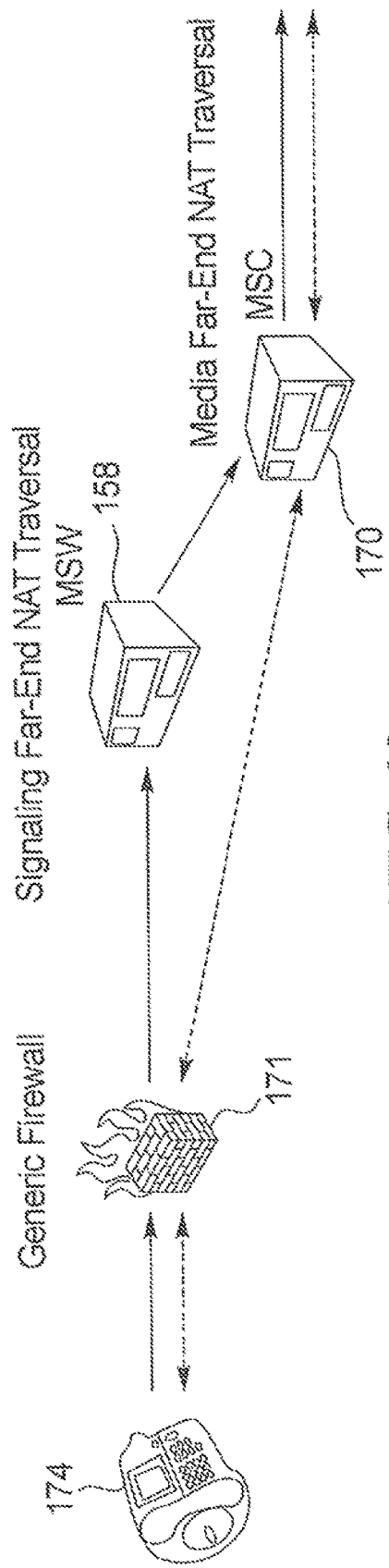
FIG. 13 is a schematic diagram of a separation between signally and media on a far-end network address translator traversal.

Separation between signaling and media network address translation traversal is far-end signaling and media network address translation traversal is shown in FIG. 13. The multi-protocol session controller separates the far end NAT traversal from the signaling end NAT traversal, and is controlled through configuration. For example, the multi-protocol session controller can be deployed in the configuration shown in FIG. 13.

Independence of network address translation traversal and media routing policy is now discussed. Enabling network address translator traversal on an endpoint does not imply that the multi-protocol session controller will take control of media routing for all calls destined to/originating from it.

Figure 14:
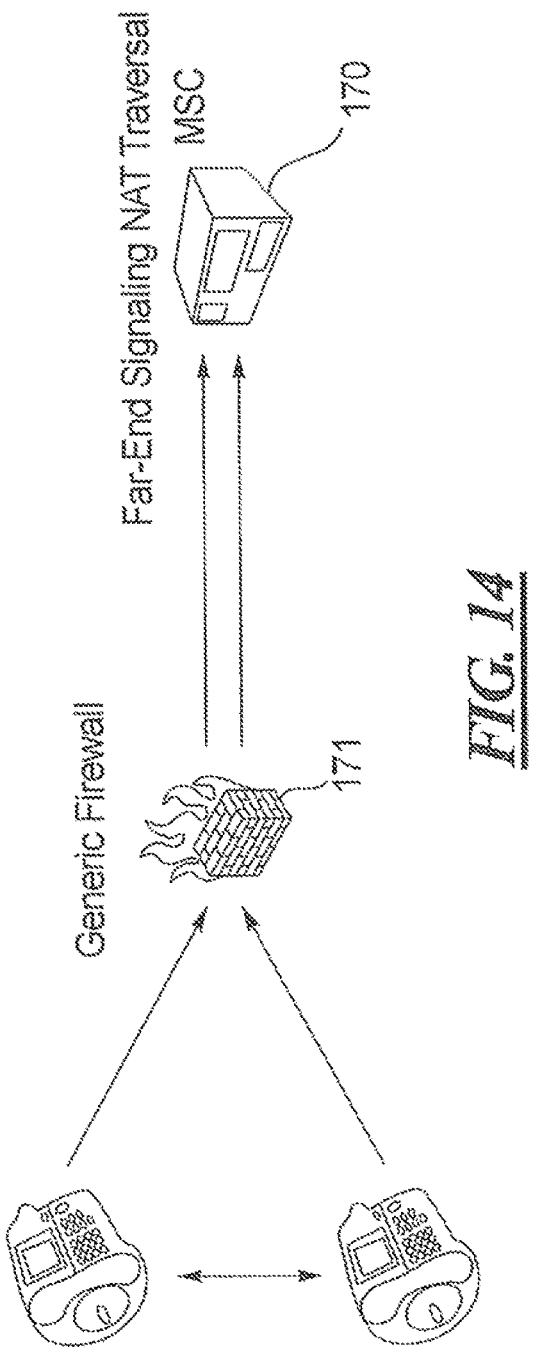
FIG. 14 is a schematic diagram of a first scenario for a network address translator traversal trough a single firewall.
Figure 15:
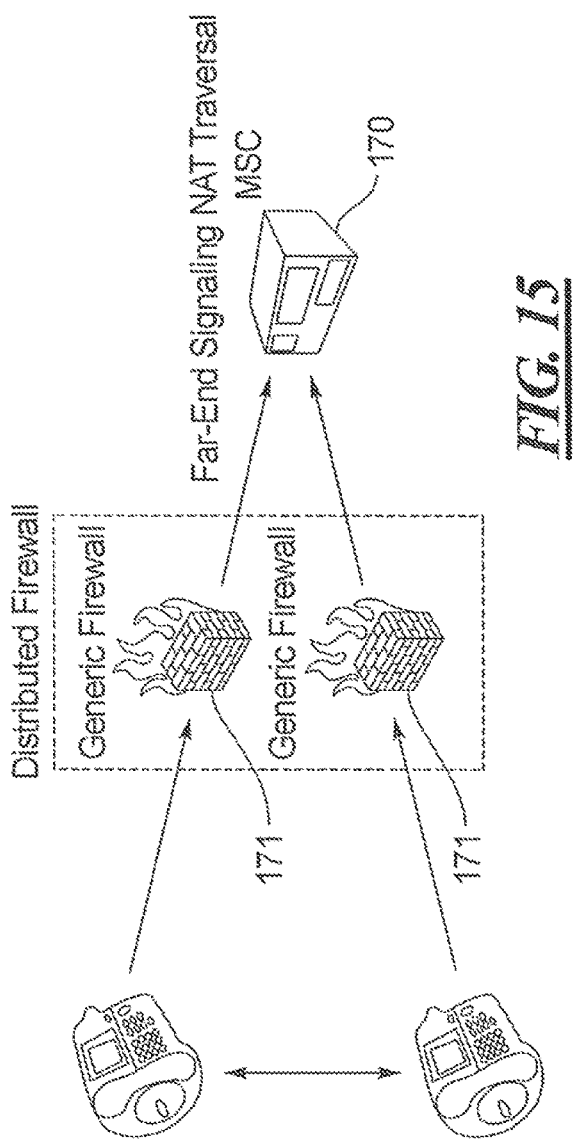
FIG. 15 is a schematic diagram of is a second scenario for a network address translator traversal trough a distributed firewall.
Figure 16:
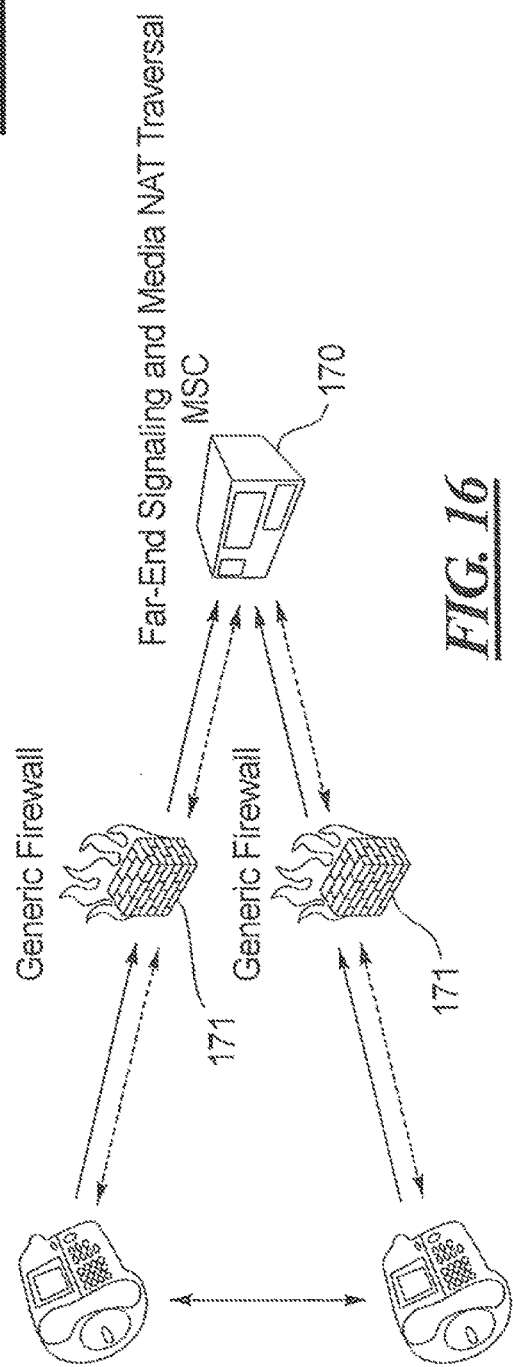
FIG. 16 is a-schematic diagram of is a third scenario for a network address translator traversal through two firewalls.

See FIGS. 14, 15 and 16 for network address translator traversal scenarios. In each of these scenarios, the administrator would have network address translator traversal enabled on the call peers. In the scenario where the endpoints are dynamic, their configuration for network address translator traversal will be inherited from a global configuration file or the templates. This configuration will enable signaling network address translator traversal. The media routing configuration for the call peer groups which the call peers are part of will then be applied to determine how media must be routed.

The ring-back problem (183→200) will now be described. The numbers 183 and 200 refer to message codes for responses. In the SIP, a message code 183 refers to ringing of the phone being called and a message coded 200 indicates that the user has picked up the phone and that the call set up is completed. The 200 OK message is sent to the call initiating phone. The multi-protocol session controller will optionally allow a SIP 183 message to be signaled as a 200 OK message to the caller, to circumvent the ring-back problem. Calls for which this signaling is employed and which do not connect are reported in a normal fashion. The only change in the call detailed records will be that the last message sent to a caller indicates a 200 OK message. It is not advisable to do billing on the caller side in this scenario. This feature can be configured on the template ports or actual phone ports. This feature is not advised to be used for STUN (simple traversal of UDP through NATs) capable clients. This is a protocol that allows applications to discover the presence and types of network address translators.

Issues with network address translator traversal, include that any media sent by the called party before the caller sends media may get clipped. The 183→200 conversion above alleviates this problem in cases where the called party sends media along with 183 and not before it. With the 183→200 conversion described above, the multi-protocol session controller will hang up the calling party if any other final response other than 200 is received on the called side. An appropriate reason header may be used in the BYE message. Note that 3xx responses coming after the 183 will not be pursued.

Another solution to this is to use a media server/application server. The multi-protocol session controller can route the call to an application server after detecting that the call came from a device behind a network address translator. The application server will connect the call to a media server and hunt on the second leg of the call.

Interaction with STUN/ICE based systems: The Far-End NAT traversal implemented on the multi-protocol session controller is fully compatible with STUN/ICE based systems which may also use RFC 3581.

Quality of service and integration with the Juniper Networks Service Deployment System are described hereinafter.

Figure 17:
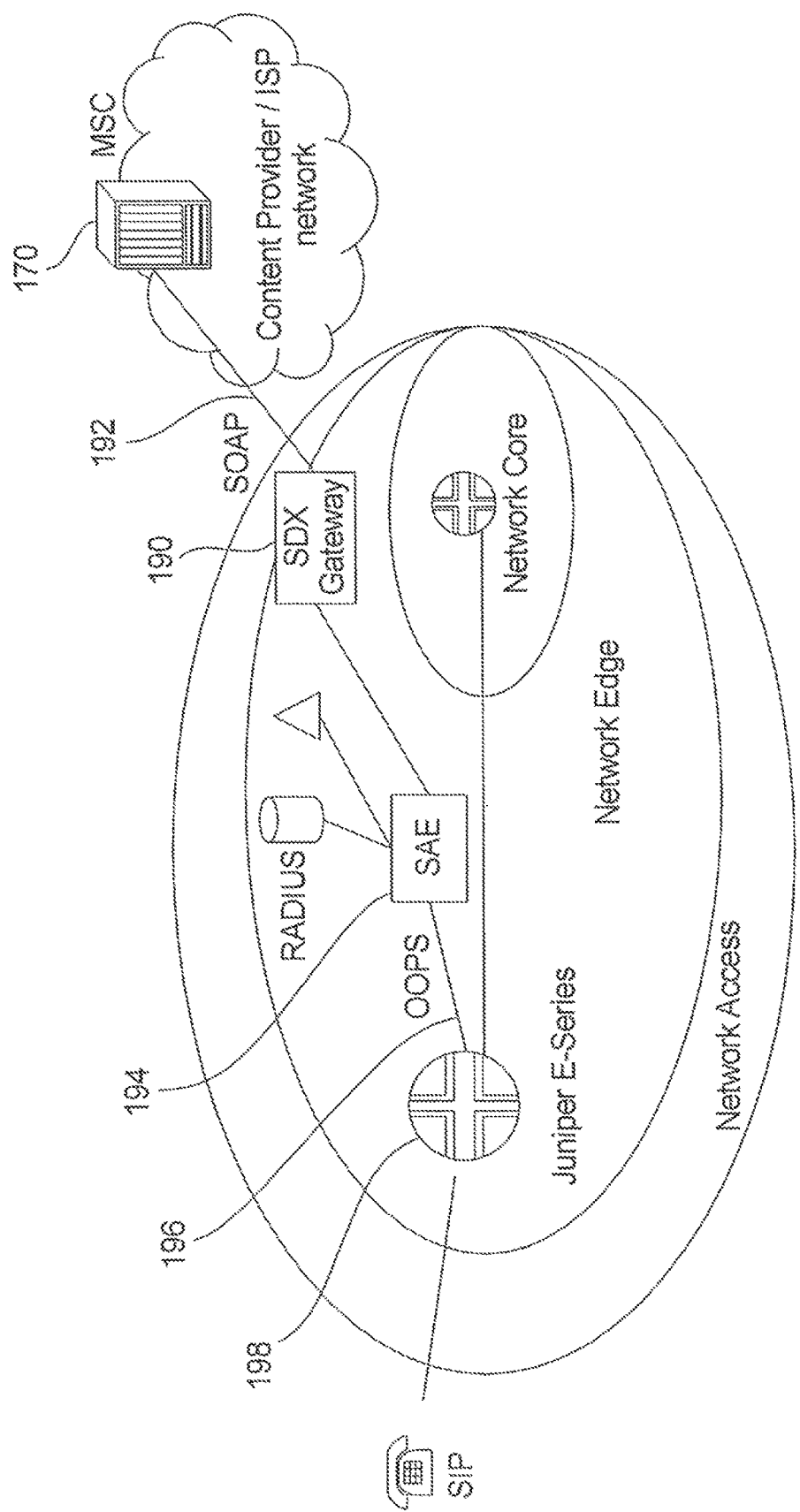
FIG. 17 is a schematic diagram of a multi-protocol session controller as an SDX gateway client.

The multi-protocol session controller 170 can be integrated with the Juniper Networks SDX system. The SDX enables service delivery to subscribers over a variety of broadband access technologies like DSL, Cable etc. The SDX works with the Juniper Networks Edge Router (ERX) and allows activation of service on an as needed basis. The multi-protocol session controller 170 could be owned by the wholesaler (who owns and administers the core network) or the retailer (who may manage the subscribers or services). The FIG. 17 illustrates the positioning of multi-protocol session controller in such a system.

The SDX Gateway 190 is a component of the SDX system which allows external components to interact with the SDX components through a simple object access protocol (SOAP) interface 192 (the multi-protocol session controller uses the Content Provider web application). The SDX Gateway communicates policy to the SAE 194 which uses common object policy service (COPS) 196 to provision the ERX (a Juniper Networks ERX Series Edge Router) 198 and reserve resources for the media to flow through the network.

A simplified session initiation protocol call flow is outlined. Media which starts to flow before the multi-protocol session controller communicates the policy to the SDX may not get the right class of treatment. For H.323, the provisioning is similar. The multi-protocol session controller does not report media/quality of service statistics in call detailed records in this scenario.

The reporting of quality of service and call statistics is carried out as follows. The multi-protocol session controller will report the following quality of service and call statistics in order to enable quality reporting and diagnostics. These statistics will be reported only when multi-protocol session controller is controlling the media flows in the network.

| Parameter | Reporting basis | Format | Definition |
|---|---|---|---|
| SIP Signaling message retransmissions | Call-peer | integer | Resettable. Indicates how many retransmissions of requests and responses have occurred over an aggregate of calls done |

-continued

| Parameter | Reporting basis | Format | Definition |
|---|---|---|---|
| Codec | CDR | string | Indicates what codec was used for the call since the last reset |
| Packet Loss Rate | CDR | Fixed point number with the binary point at left edge of the field. | The fraction of RTP data packets from the source lost since the beginning of reception |
| Packet Discard Rate | CDR | Fixed point number with the binary point at left edge of the field. | The fraction of RTP data packets from the source that have been discarded since the beginning of reception, due to late or early arrival, under-run or overflow at the receiving jitter buffer. |
| Burst Density | CDR | Fixed point number with the binary point at left edge of the field. | The fraction of RTP data packets within burst periods since the beginning of reception that were either lost or discarded. |
| Gap Density | CDR | Fixed point number with the binary point at left edge of the field. | The fraction of RTP data packets within inter-burst gaps since the beginning of reception that were either lost or discarded. |
| Burst Duration | CDR | milliseconds | The mean duration, expressed in milliseconds, of the gap periods that have occurred since the beginning of reception. |
| R factor | CDR | integer in the range 0 to 100, with a value of 94 corresponding to "toll quality" and values of 50 or less regarded as unusable | The R factor is a voice quality metric describing the segment of the call that is carried over this RTP session. |
| MOS-LQ | CDR | on a scale from 1 to 5, in which 5 represents excellent and 1 represents unacceptable. | The estimated mean opinion score for listening quality |
| MOS-CQ | CDR | on a scale from 1 to 5, in which 5 represents excellent and 1 represents unacceptable. | The estimated mean opinion score for conversational quality |

For voice and fax, or facsimile, transcoding the MSC can act as a transcoding engine for voice and fax calls. Transcoding services are provided for calls handed off to an access network which requires a different level of compression than used by the ingress network. The multi-protocol session controller may deploy external media resources to perform the transcoding. These resources may be deployed at the access network or centralized in the network core.

Figure 18:
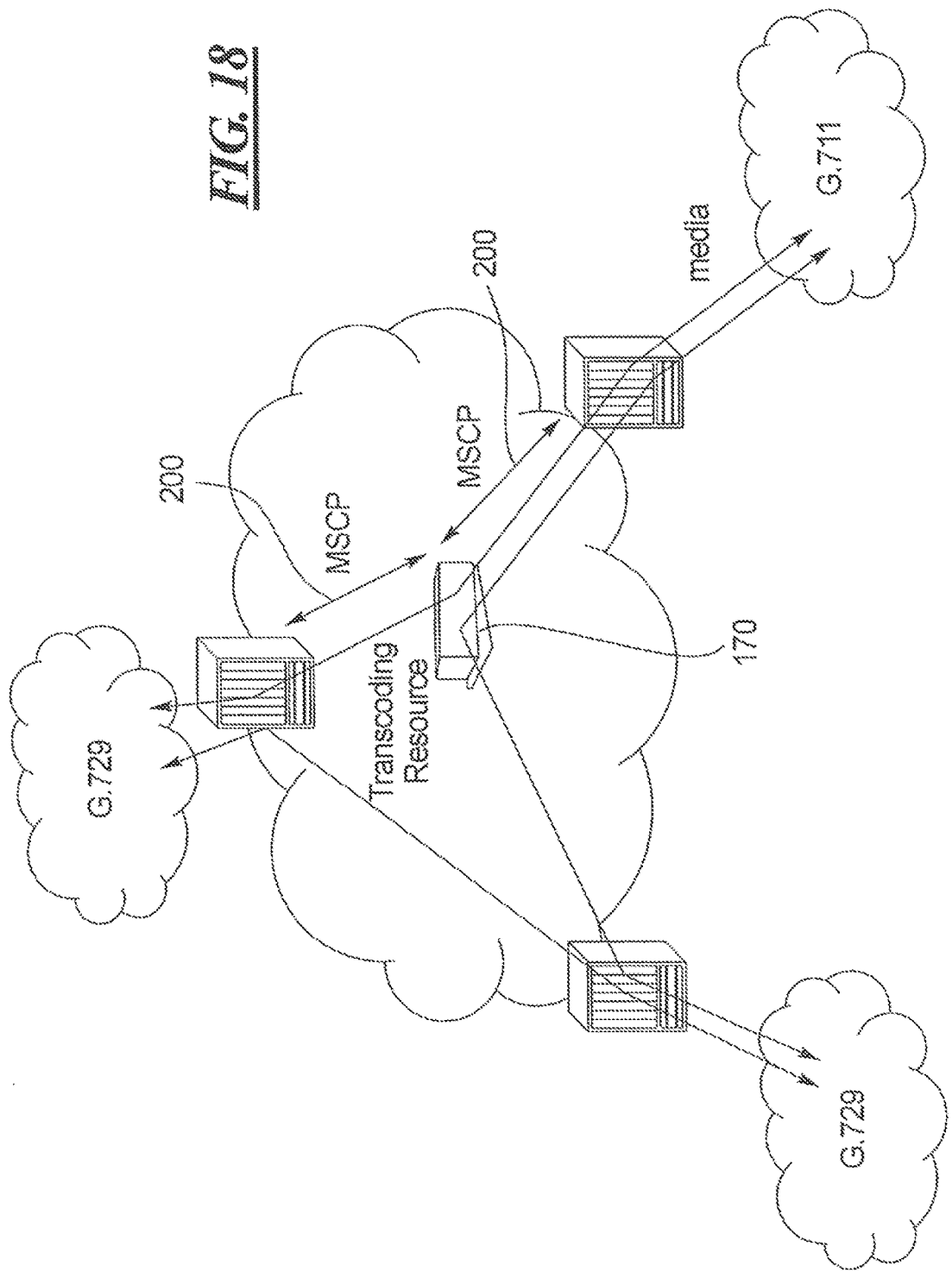
FIG. 18 is a schematic representation of shared transcoding resources at a network core.

As shown in FIG. 18, the multi-protocol session controller 170 provides the following transcoding functions: G.729 ↔ G.711, T.38 Fax z, 900 G.711 Pass Through fax, and DTMF (dual tone multi frequency) Transcoding (RFC 2833 based DTMF ↔ G.711 in band DTMF).

The transcoding function complies with the RTP Translator defined in RFC 3550. The transcoding function is available for both session initiation protocol and H.323 calls and is done on a per call basis.

Deployment of transcoding resources may be provided in the access network or core network. The multi-protocol session controller 170 controls the transcoding resource by using the MSCP (Media Services Control Protocol) 200 which allows the transcoding resource to be controlled by multiple multi-protocol session controllers. The multi-protocol session controller always acts as the point where media enters or leaves the access network.

The multi-protocol session controller can use the following media gateways for purposes of transcoding.

| Media Gateway | Support for 1 + 1 Redundancy | Support for Fax Transcoding | Density |
|---|---|---|---|
| Brooktrout's Snowshore Media Firewall | Yes | Planned | 700 |
| Audiocodes IP Media 2000 Server | No | Yes | 1810-200 2810-300 6310-2000 |

The call flows are described. These flows also use the MSCP Gateway which converts between MSCP and the proprietary TPNCP (Audiocodes).

Thus, the present invention provides improvements including: selective media routing; call routing with layer two, layer three, codec (coding and decoding), and MOS (mean opinion score) qualifiers; an MFCP and MFCP gateway; inter-working function (IWF) and video; an integrated system for least cost call routing; and an integrated system for maximum profit call routing. These features unique to embodiments of the present invention and provide significant differentiation to this technology.

The mean opinion score (MOS) is a scale that determines relative quality of voice communications as subjectively perceived by human users listening to speech over a communications network. One way delay and signal loss are significant factors in the mean opinion score, although other factors affect the perception of the human user as well.

Selective media routing is provided. The present technology allows the separation of the signaling and bearer networks. However, typically, the signaling and/or bearer are forced through certain network elements to monitor and enforce quality of service, optimize network route etc.

Selective media routing provides control to the network service provider to do media routing on a dynamic basis, with the least amount of configuration. Selective media routing policies are based on either ingress or egress call peer's policies. The criteria for both precedence values and on/off is network design, based on the creation of trust boundaries. If the peers are all inside the network operators trust boundary, then there is no need to do media routing. Hence, most of the peers that are designed to handle calls within the trust boundary will have the default value for the policy set to "OFF". However, peers at the edge of the network can potentially have calls routed to them from non-trusted networks. When calls come from non-trusted networks, then such calls should be media routed. So, a precedence value is set in the edge peers; if the value of the precedence value is lower than the non-trusted peer's precedence value, then the media routing policy of the non-trusted peer takes over and media routing happens.

Figure 20:
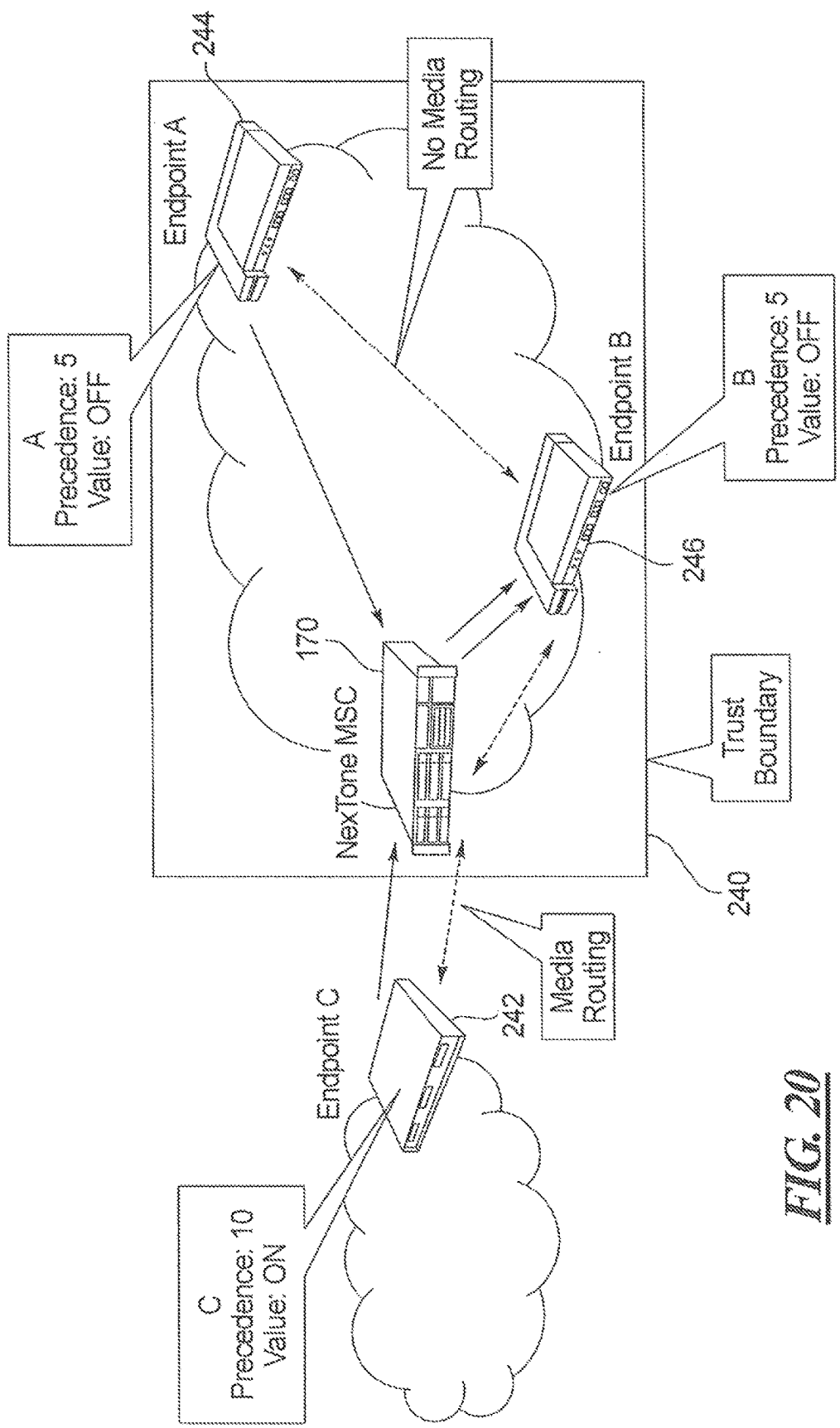
FIG. 20 is a schematic view of a session controller within a trusted network providing media communications to non-trusted network.

See FIG. 20 for an example wherein the multi-protocol session controller 170 is connected at a trust boundary 240 to provide media communications across the trust boundary to an endpoint C 242. Endpoints A and B 244 and 246 are within the trust boundary 240. The precedence for endpoint C is at 10 with the value set to ON, while the precedence for endpoint A 244 is at 5 with the value OFF, and for endpoint B is at 5 with the value OFF.

The following table provides an overview of whether media routing is used in communications between trusted and non-trusted networks.

| | | |
|---|---|---|
| Non-trusted network | Trusted network | Always media route |
| Non-trusted network | Non-trusted network | Always media route |
| Trusted network | Trusted network | Do not media route |
| Trusted network | Non-trusted network | Always media route |

Figure 19:
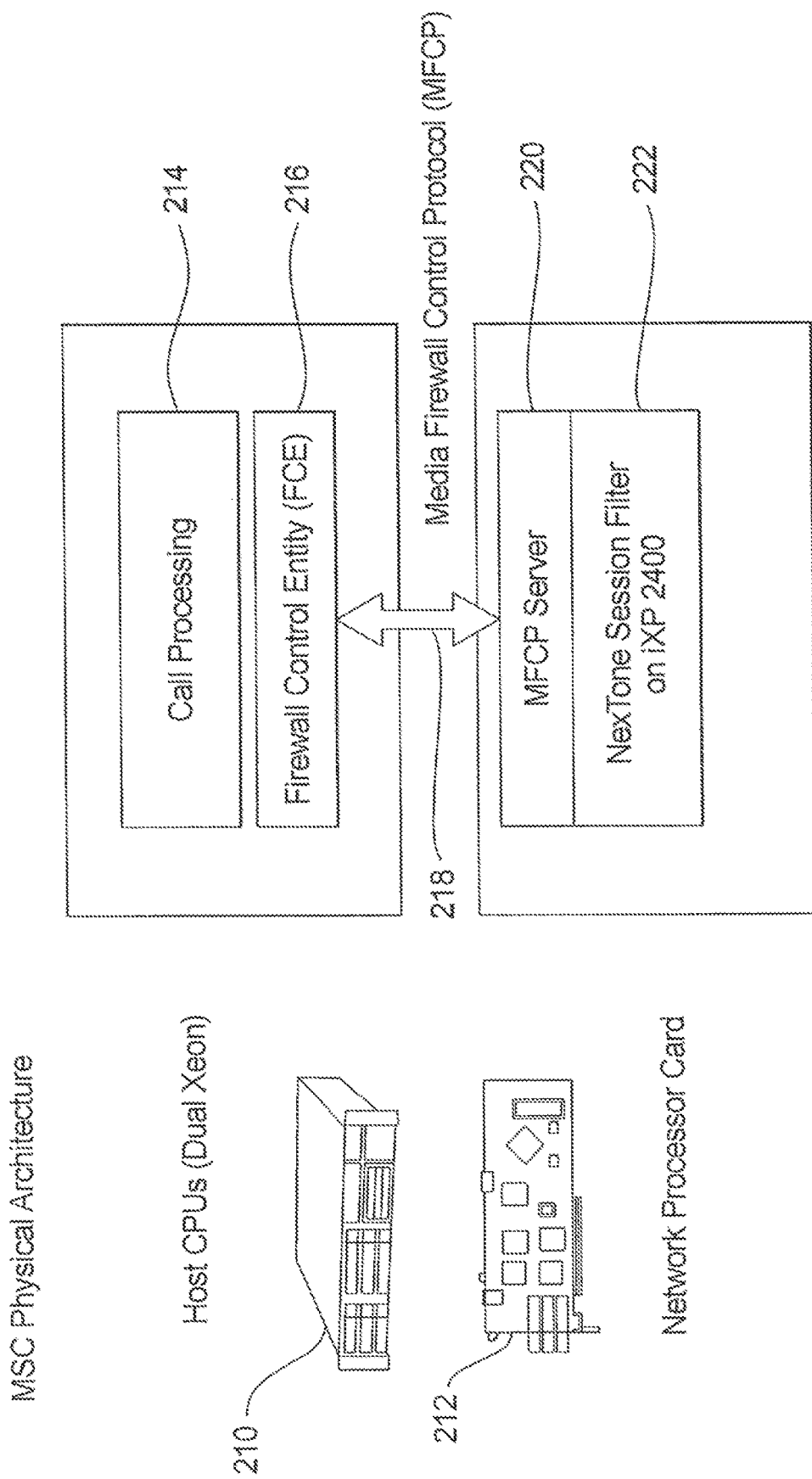
FIG. 19 is a diagram of the physical architecture of a multi-protocol session controller according to the present invention.

Turning to FIG. 19, the figure shows the physical architecture of the multi-protocol session controller 170. A dual CPU processing unit 210 is liked with a network processor cart 212. Operating components include a call processing unit 214 with a firewall control entity (FCE) 216 as an interface to a media firewall control protocol (MFCP) 218. The MFCP 218 communicates through an MFCP server 220 to a session filter on iXP2400, 222, that enables separation of signaling and bearer channels.

The Media Routing functionality has been described elsewhere in this specification.

Call routing with qualifiers will now be described. The traditional concept of call routing involves making decisions on which trunk to "switch" on based on the dialed number for the call, and/or the originating trunk. However, in VoIP based call routing, the present invention has extended that notion to include call routing with layer two identifiers such as VLAN IDs (Virtual LAN Identifiers), with layer three identifiers such as DiffServ/TOS markings, with codec (coding and decoding device) preferences for the call, and with mean opinion scores (MOS) qualifier for previous calls to and/or from that destination/origination, etc. The present call routing can ensure a high quality of service of the call by controlling the call routing.

In call routing with qualifiers, criteria are used for identifying layer 2 and layer 3 components. The layer 2 and layer 3 qualifiers are used to identify the source as well as set a marker for the egress network to use for its quality of service. Typical layer 2 qualifiers are VLAN tags and priority bits. The VLAN tags are specified in IEEE Standard 802.1Q and the priority bits are specified in IEEE Standard 802.1p. Using the VLAN tags, the present multi-protocol session controller can identify the source of the call and media as from a given call peer. Once the ingress call peer is identified, then appropriate policies can be applied to the call. Layer 3 identifiers are typically a uniquely identifiable IP address and IP subnet addresses.

Figure 21:
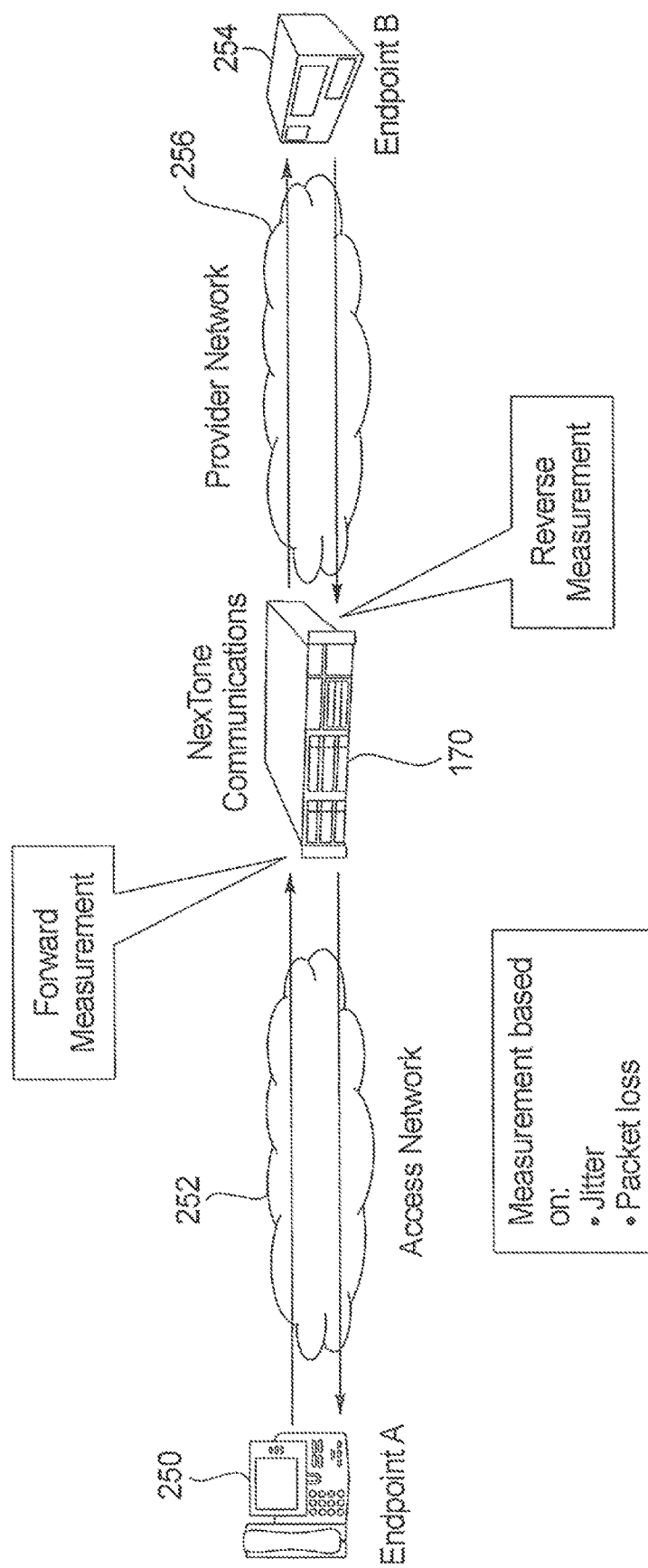
FIG. 21 is a schematic representation of a measure of call quality using the present session controller.

The mean opinion score (MOS) is used by the multi-protocol session controller and is derived by looking at the incoming media stream and making measurements of jitter, latency and packet loss. The computation of the MOS score is based on the ITU-T standard E-model (G.107). FIG. 21 illustrates the voice quality measurement for MOS and E-model. The multi-protocol session controller 170 is provided between endpoint A 250 on an access network 252 and an endpoint B 254 on a provider network 256. Measurements of call quality are based on jitter and packet loss and are made as forward measurements for communications from endpoint A 250 to endpoint B 254 and as reverse measurements for communications from endpoint B 254 to endpoint A 250.

A media firewall control protocol (MFCP) gateway is provided. To separate signaling and media networks and to scale signaling and media independently, a "control" protocol was specified. This control protocol is referred to as Media Firewall Control Protocol (MFCP) 218. The media firewall control protocol can be used to control firewalls, media servers and also edge routers. However, firewalls, media servers and edge routers may have implemented their own control protocol for updating policies on their system. The present invention provides a logical entity called the MFCP Gateway that takes MFCP as an input and converts it to the appropriate control protocol of the firewall, media server or edge router.

An interworking function (IWF) and video is provided. The interworking Function (IWF) involves the conversion between SIP and H.323 call setup protocols used widely for setting up calls in the VoIP arena. Mapping between SIP and H.323 is not very straightforward, and has heretofore been loosely specified. The present technology provides for seamless conversion between SIP and H.323, and vice versa. However, video calls or calls that involves sending video and audio as media is a hard problem to solve. The mapping of video capabilities between SIP and H.323 is not well understood and not well documented. The present technology encompasses SIP-H.323 IWF for video calls also.

The present invention provides an integrated system for least cost call routing. The cost of call routing includes a number of factors, including the actual dollar cost of buying and selling routes, as well as the quality parameters such as post dial delay (PDD), answer seizure ratio (ASR), mean opinion score (MOS), and others. The dollar cost of buying and selling routes is known by the network administrator and is input by the network administrator for utilization by the session controller. The quality factors may be measured and the measurements utilized by the session controller. The present session controller utilizes this hybrid notion of cost which includes the network operator's actual cost of doing business (on that route) as well as the user experience (as measured by the quality parameters such as PDD, ASR, MOS, etc.), so that the network operator can have a very optimized network for both profit and operations.

Network operators, whose primary service to their customers is network transit, find that their cost for carrying a telephone call depends upon where the VoIP call is destined and is variable depending upon the path that that call takes through their network as well as through the networks of their partners. Hence, network operators seek to transit every call through their network using the technique called least cost routing (LCR).

The present session controller along with the iVMS provides a method for doing LCR. The present session controller routes all VoIP calls based on policies setup by the network operators. The iVMS system actually takes in rates for various paths through the network, and can compute the best set of policies that result in least cost routing of every call that the present session controller processes.

The present invention provides an integrated system for maximum profit call routing. Network operators, once they have the right policies for doing least cost routing (LCR), also have to consider the profit that they make on every call that passes through their network. To maximize profit, they have to consider not only least cost routing for carriage or termination through their network, but also the origination income. This mode of operation involves looking at aggregate cost of termination, and provides a policy layer on top of LCR, but which can also be sometimes orthogonal to it.

The present session controller along with iVMS provides a method for doing maximum profit routing (MPR). The present session controller routes all VoIP calls based on policies setup by the network operators. The iVMS system takes as input, dollar rates not only for various transit and/or terminations, but also rates for originations and then can compute the appropriate policies that result in MPR. These policies are then input into the session controller directly from the iVMS, resulting in MPR for the network operator.

Figure 22:
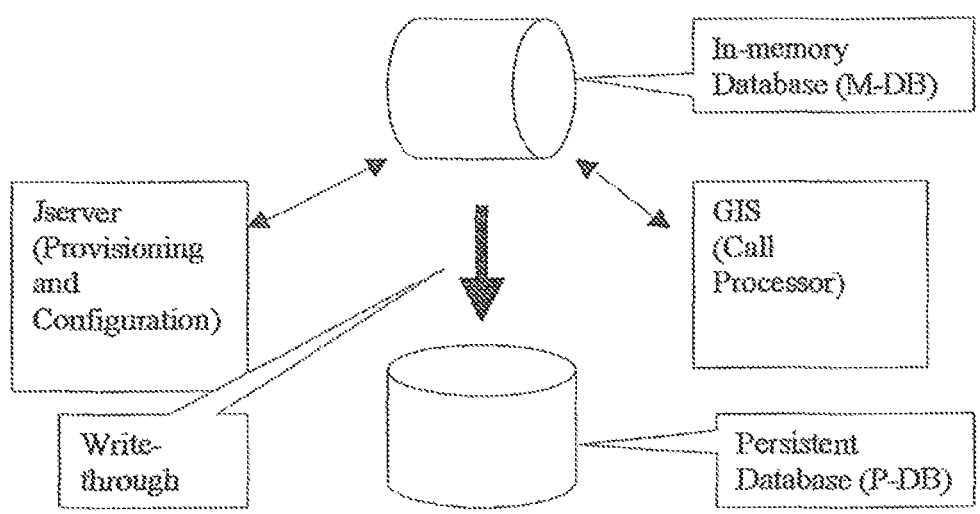
FIG. 22 is a schematic representation of an in memory database.

In another feature of a preferred embodiment, the system uses an in-memory database. In FIG. 22, the multi-protocol session controller policy database (referred to hereinafter as simply the "database") is stored in two forms on a runtime multi-protocol session controller, as a persistent database on the hard drive disk and in-memory in Random Access Memory (RAM) of the computing platform used to run the multi-protocol session controller. When the multi-protocol session controller application is started, the persistent database ("P-DB") on the disk is read and stored in memory ("M-DB") for very fast querying of the policy information required to process each call handled by the multi-protocol session controller.

Every call handled by the multi-protocol session controller requires policy lookups. The in-memory database, M-DB, provides a repository for policy information, required to process calls. Since very high performance is required of the multi-protocol session controller, these policy lookups must possess the following properties: The query time must be minimal, and must not change under the same load conditions due to other activity in the system, and the query time should not increase linearly or exponentially with the increase in the number of simultaneous calls being handled.

The in memory database M-DB was designed to satisfy these constraints. The in memory database is organized into multiple "database tables" to structure the policy data. The in memory database does not expose a standard query language interface such as SQL, to other programs. A programmatic application programming interface (API) provides atomic operations on the persistent database P-DB, which is used by the components of the multi-protocol session controller, such as the GIS (call processor), the Jserver (provisioning agent) and the CLI (command line interface). In one embodiment, the in memory database includes the following tables: call routes table, endpoint table, call plan binding table, call admission control (CAC) table, triggers table, VPN table, and realms table.

In order to query the database as quickly as possible, each table is indexed multiple times, resulting in multiple "keys" (in traditional database parlance). The innovative aspect of this table structure is that each key does not have to be unique, even though some keys are unique, such as phone numbers, for example. The search methodology for each of these keys could be different. The search methodologies used within the in memory database M-DB include: binary search, hash search, and ternary search tree.

In particular, see the following:

| Search Algorithm | Algorithm Efficiency |
| --- | --- |
| Binary search | 0 (log n) |
| Hash search | 0 (1) |
| Ternary search tree | 0 (constant * log n) |

According to an aspect of the present system, asynchronous write-through is provided. The persistent database P-DB provides persistence to the information stored in the in memory database M-DB. Hence, the information in the M-DB and the P-DB should be identical and cannot get out of synchronization for too long. At any point in time, in an operational multi-protocol session controller, the in memory database M-DB will hold the more authoritative information than the persistent database P-DB. As such, whatever information is written into the persistent database P-DB must also be written into the in memory database M-DB and vice versa. However, there are several processes that read from and update the persistent database P-DB. A common Application Programming Interface (API) is used to interface to the database. The API to the persistent database P-DB is used by the CLI (command line interface), GIS (call processor) and the Jserver (provisioning agent) processes.

This is a process whereby the persistent database P-DB is updated via a "write-through" of the in memory M-DB. The in memory database M-DB is always updated first before the persistent database P-DB is updated.

The API to the persistent database P-DB updates the in memory database M-DB database transparently. The API also updates the in memory database M-DB first, before updating the persistent database P-DB. The side effect of this is that multiple commits to the same table of the M-DB can happen before the P-DB is actually updated. In such cases, the persistent database P-DB will only have the last and most authoritative update committed. This is achieved by the API using two principles: asynchronicity and data independent update.

In updating using asynchronicity, the API performs an asynchronous update of the information. Any information given to the API for committing into the database is first updated into the in memory database M-DB and then queued for update to the persistent database P-DB. The queuing is necessary as the disk update requires operating system scheduling intervention, and a bulk update of the disk is more efficient than multiple sporadic writes to the disk. However, the information is already committed to the in memory database M-DB and hence is available to all the processes for querying.

The API when updating the in memory database M-DB, only uses the keys to the table and is not aware of the data itself. In traditional Structured Query Language (SQL) based database systems, the commit command carries the data to be updated too. However, the API here is only aware of the keys and not the data itself. The data is opaque to the API. As soon as the API uses the key to find the correct entry, the commit of the data happens in one operation. If a subsequent commit operates on the same key, then the data in the in memory database M-DB will get updated again, even before the commit queue to the persistent database P-DB is completed.

The asynchronous write-through procedure of the database provides a number of benefits, including that the information is always available for high performance applications, the integrity of information and sequentiality is maintained, and the persistence of information is transparently maintained.

Thus, there is provided a system and method for voice and real time or at least nearly real time communications over a packet switched network. The present system includes a multi-protocol session controller that can be deployed as either a core controller or a border controller. The present session controller provides selective media routing; call routing with layer two, layer three, codec (coding and decoding), and MOS (mean opinion score) qualifiers; an MFCP and MFCP gateway; inter-working function (IWF) and video; an integrated system for least cost call routing; an integrated system for maximum profit call routing; and an in memory database.

Although other modifications and changes may be suggested by those skilled in the art, it is the intention of the inventors to embody within the patent warranted hereon all changes and modifications as reasonably and properly come within the scope of their contribution to the art.

We claim:

1. A method, comprising:
receiving a registration indicating an endpoint is utilizing a first network layer address;
processing a communication on behalf of the endpoint, wherein the communication is processed using a call peer that is bound to the first network layer address;
applying a first topology hiding policy to the communication;
receiving an updated registration indicating the endpoint is utilizing a second network layer address;
binding the call peer to the second network layer address; and
applying a second topology hiding policy to the communication.

2. The method of claim 1, wherein the communication includes a Voice over Internet Protocol (VoIP) call.

3. The method of claim 1, wherein the communication comprises a plurality of packets from the endpoint, and wherein the plurality of packets identify the first network address utilized by the endpoint, and wherein the first topology hiding policy modifies the plurality of packets at least in part by replacing the first network layer address with a third network layer address.

4. The method of claim 3, wherein the first network layer address comprises a first Internet Protocol (IP) address, and wherein the third network layer address comprise a third IP address.

5. The method of claim 4, wherein the first IP address uses a first IP address version, and wherein the third IP address a third IP address version.

6. The method of claim 3, wherein the first network layer address comprises an first IP subnet, and wherein the third network layer address comprises a third IP subnet.

7. The method of claim 3, wherein the first network layer address comprises a first Virtual Local Area Network (VLAN) tag, and wherein the third network layer address comprises a third VLAN tag.

8. The method of claim 3, wherein the first network layer address comprises a first differentiated services code point (DSCP), and wherein the third network layer address comprises a third DSCP.

9. The method of claim 3, wherein the first topology hiding policy is determined based on the first network address and the second topology hiding policy is determined based on the second network layer address.

10. The method of claim 1, wherein the first topology hiding policy is determined based on a template that is selected based on the first network address, and wherein the second topology hiding policy is determined based on a template that is selected based on second network address.

11. The method of claim 10, wherein the call peer is selected based on the template.

12. A computer-readable storage device having program instructions stored thereon that, upon execution by a processor of a session border controller, cause the session border controller to:
receive a registration indicating an endpoint is utilizing a first network layer address;
process a Voice over Internet Protocol (VoIP) call on behalf of the endpoint wherein the VoIP call is processed using a call peer that is bound to the first network layer address;
apply a first topology hiding policy to the VoIP call;
receive an updated registration indicating the endpoint is utilizing a second network layer address;
bind the call peer to the second network layer address; and
apply a second topology hiding policy to the VoIP call.

13. The computer-readable storage device of claim 12, wherein the VoIP call comprises a plurality of packets from the endpoint, and wherein the plurality of packets identify the first network address utilized by the endpoint, and wherein the first topology hiding policy modifies the plurality of packets at least in part by replacing the first network layer address network layer address with a third network layer address.

14. The computer-readable storage device of claim 13, wherein the first topology hiding policy is determined based on the first network address and the second topology hiding policy is determined based on the second network layer address.

15. The computer-readable storage device of claim 13, wherein the first topology hiding policy is determined based on a template that is selected based on the first network address, and wherein the second topology hiding policy is determined based on a template that is selected based on second network address.

16. A Border Session Controller, comprising:
a processor; and
a memory coupled to the processor, the memory having program instructions stored thereon that, upon execution by the processor, cause the Border Session Controller to:
receive a registration indicating an endpoint is utilizing a first network layer address;
process a Voice over Internet Protocol (VoIP) call on behalf of the endpoint, wherein the VoIP call is processed using a call peer that is bound to the first network layer address;
apply a first topology hiding policy to the VoIP call;
receive an updated registration indicating the endpoint is utilizing a second network layer address;
binding the call peer to the second network layer address; and
applying a second topology hiding policy to the VoIP.

17. The Border Session Controller of claim 16, wherein the VoIP call comprises a plurality of packets from the endpoint, and wherein the plurality of packets identify the first network address utilized by the endpoint, and wherein the first topology hiding policy replaces the first network layer address with a third network layer address.

18. The Border Session Controller of claim 17, wherein the first topology hiding policy is determined based on the first network address and the second topology hiding policy is determined based on the second network layer address.

19. The Border Session Controller of claim 17, wherein the first topology hiding policy is determined based on a template that is selected based on the first network address, and wherein the second topology hiding policy is determined based on a template that is selected based on second network address.

* * * * *